(12) United States Patent
Wakabayashi

(10) Patent No.: US 12,334,246 B2
(45) Date of Patent: Jun. 17, 2025

(54) ELECTRONIC COMPONENT AND METHOD OF MANUFACTURING THE SAME

(71) Applicant: TAIYO YUDEN CO., LTD., Tokyo (JP)

(72) Inventor: Hirotaka Wakabayashi, Tokyo (JP)

(73) Assignee: TAIYO YUDEN CO., LTD., Tokyo (JP)

(*) Notice: Subject to any disclaimer, the term of this patent is extended or adjusted under 35 U.S.C. 154(b) by 783 days.

(21) Appl. No.: 17/473,351

(22) Filed: Sep. 13, 2021

(65) Prior Publication Data

US 2022/0102062 A1 Mar. 31, 2022

(30) Foreign Application Priority Data

Sep. 30, 2020 (JP) .................... 2020-166434

(51) Int. Cl.
*H01F 27/29* (2006.01)
*H01F 27/255* (2006.01)
*H01F 41/04* (2006.01)

(52) U.S. Cl.
CPC ........... *H01F 27/29* (2013.01); *H01F 27/255* (2013.01); *H01F 41/04* (2013.01)

(58) Field of Classification Search
CPC ........ H01F 27/29; H01F 27/255; H01F 41/04; H01F 41/10; H01F 27/2804; H01F 27/2823; H01F 41/043; H01F 41/046; H01F 2017/048; H01F 1/33; H01F 27/292; H01G 4/232; H01G 4/2325; H01G 4/30
See application file for complete search history.

(56) References Cited

U.S. PATENT DOCUMENTS

| 2007/0057237 A1 | 3/2007 | Ohtani et al. |
| 2009/0058591 A1 | 3/2009 | Nakada et al. |
| 2012/0295122 A1* | 11/2012 | Park ................ C03C 3/089 |
| | | 428/471 |
| 2014/0292142 A1 | 10/2014 | Nishisaka et al. |

FOREIGN PATENT DOCUMENTS

| JP | 2002-208535 A | | 7/2002 |
| JP | 2004235375 A | * | 8/2004 |
| JP | 2004350236 A | * | 12/2004 |
| JP | 2005-150659 A | | 6/2005 |
| JP | 2006-253094 A | | 9/2006 |

(Continued)

OTHER PUBLICATIONS

Decision of Refusal dated Sep. 3, 2024, issued in corresponding Japanese Patent Application No. 2020-166434 with English translation (13 pgs.).

(Continued)

*Primary Examiner* — Tuyen T Nguyen
(74) *Attorney, Agent, or Firm* — Pillsbury Winthrop Shaw Pittman, LLP

(57) ABSTRACT

A coil component according to one aspect of the invention includes an insulating base body, an external electrode provided on the base body, and a functional part electrically connected to the external electrode. The external electrode includes a metal portion, glass, and metal oxide, the metal portion being made of a metal material and having electric conductivity, the metal oxide being electrically non-conductive.

11 Claims, 6 Drawing Sheets

(56) References Cited

FOREIGN PATENT DOCUMENTS

| | | |
|---|---|---|
| JP | 2009-064896 A | 3/2009 |
| JP | 2014-209550 A | 11/2014 |
| JP | 2017-005087 A | 1/2017 |
| JP | 2017-147430 A | 8/2017 |
| WO | 2006/003755 A1 | 4/2008 |
| WO | WO-2016035482 A1 * | 3/2016 ............. H01C 1/148 |

OTHER PUBLICATIONS

Notice of Reasons for Refusal dated Mar. 5, 2024, issued in corresponding Japanese Patent Application No. 2020-166434, with English translation (12 pgs.).

* cited by examiner

ELECTRONIC COMPONENT AND METHOD OF MANUFACTURING THE SAME

CROSS-REFERENCE TO RELATED APPLICATIONS

This application is based on and claims the benefit of priority from Japanese Patent Application Serial No. 2020-166434 (filed on Sep. 30, 2020), the contents of which are hereby incorporated by reference in their entirety.

TECHNICAL FIELD

The present disclosure relates to an electronic component and a method of manufacturing the electronic component.

BACKGROUND

A conventional electronic component such as an inductor or a capacitor includes a base body, a functional part provided in the base body, and external electrodes electrically connected to the ends of the functional part. For example, an inductor includes a coil conductor as a functional part, and a capacitor includes a pair of electrodes producing a capacitance as a functional part. The external electrodes of such electronic components are formed by, for example, applying a conductive paste containing conductive metal particles to the surface of the base body and performing heat treatment. The conductive paste may contain glass for the purpose of increasing the adhesion strength between the base body and the external electrodes. For example, Japanese Patent Application Publication No. 2017-005087 discloses a chip inductor including external electrodes formed from a conductive paste containing glass powder.

When the conductive paste containing glass is heat-treated to form the external electrodes, the glass having a high affinity for the base body mediates between the external electrodes and the base body. Therefore, the adhesion strength between the base body and the external electrodes can be increased. However, since the conductive paste contains glass, the glass is also present on the surface of the external electrodes, possibly reducing the bonding strength between the external electrodes and external terminals connected to the surface of the external electrodes or between the external electrodes and plating layers formed on the surface of the external electrodes.

SUMMARY

One object of the present invention is to provide an electronic component including external electrodes having a high bonding strength with external terminals or plating layers, and a method of manufacturing the electronic component. Other objects of the present invention will be made apparent through the entire description in the specification. The invention disclosed herein may also address drawbacks other than that grasped from the above description.

A coil component according to one aspect of the invention includes an insulating base body, an external electrode provided on the base body, and a functional part electrically connected to the external electrode. The external electrode includes a metal portion, glass, and metal oxide, the metal portion being made of a metal material and having electric conductivity, the metal oxide being electrically non-conductive.

In an aspect of the present invention, the external electrode has an inner peripheral surface and an outer peripheral surface, the inner peripheral surface faces a surface of the base body, the outer peripheral surface is opposite to the inner peripheral surface, the metal portion is exposed from the outer peripheral surface, and the electronic component includes a glass layer disposed in contact with the surface of the base body and the inner peripheral surface of the external electrode.

In an aspect of the present invention, the metal portion may be exposed in three-fourth or larger of an area of the outer peripheral surface.

In an aspect of the present invention, the external electrode includes a glass aggregation region made of an aggregation of the glass, and the glass aggregation region is in contact with the metal oxide.

In an aspect of the present invention, the metal oxide may be oxide of a transition metal.

In an aspect of the present invention, the electronic component further includes a plating layer disposed on the outer peripheral surface of the external electrode.

In an aspect of the present invention, the functional part includes a conductor wound around a coil axis.

In an aspect of the present invention, the functional part includes a pair of electrodes for generating a capacitance.

In an aspect of the present invention, the glass does not contain lead, and a melting point of the glass is 500° C. or lower.

In an aspect of the present invention, the base body includes oxide.

One aspect of the present invention relates to a circuit board comprising any one of the above electronic components. One aspect of the present invention relates to an electronic device comprising the above circuit board.

A method of manufacturing an electronic component related to one aspect of the present invention includes the steps of: preparing a base body made of an insulating material and including a functional part made of a metal; preparing a conductive paste containing conductive metal particles, non-conductive metal oxide, and glass; forming a conductive paste layer on a surface of the base body, the conductive paste layer being made of the conductive paste; and heat-treating the conductive paste layer.

In an aspect of the present invention, a proportion by volume of the metal oxide in the conductive paste may be 2% or larger.

In an aspect of the present invention, a volume ratio of the glass to the metal oxide in the conductive paste may be not less than 2.0 and not more than 5.3.

In an aspect of the present invention, the step of heat-treating the conductive paste layer forms an external electrode and a glass layer, the external electrode containing the metal particles, the glass layer being disposed between the base body and the external electrode.

In an aspect of the present invention, an average particle size of the metal particles may be not less than 1 μm and not more than 10 μm.

In an aspect of the present invention, the metal particles include high aspect ratio particles having an aspect ratio of 3 or higher.

In an aspect of the present invention, an average of minimum radii of curvature of the high aspect ratio particles may be 3 μm or smaller.

Advantageous Effects

The present invention provides an electronic component including external electrodes bonded to both a base body and external terminals or plating layers with a high bonding strength, and a method of manufacturing the electronic component.

DESCRIPTION OF THE EMBODIMENTS

Various embodiments of the present invention will be hereinafter described with reference to the accompanying drawings. The constituents common to more than one drawing are denoted by the same reference signs throughout the drawings. For convenience of explanation, the drawings are not necessarily drawn to scale.

Figure 1:
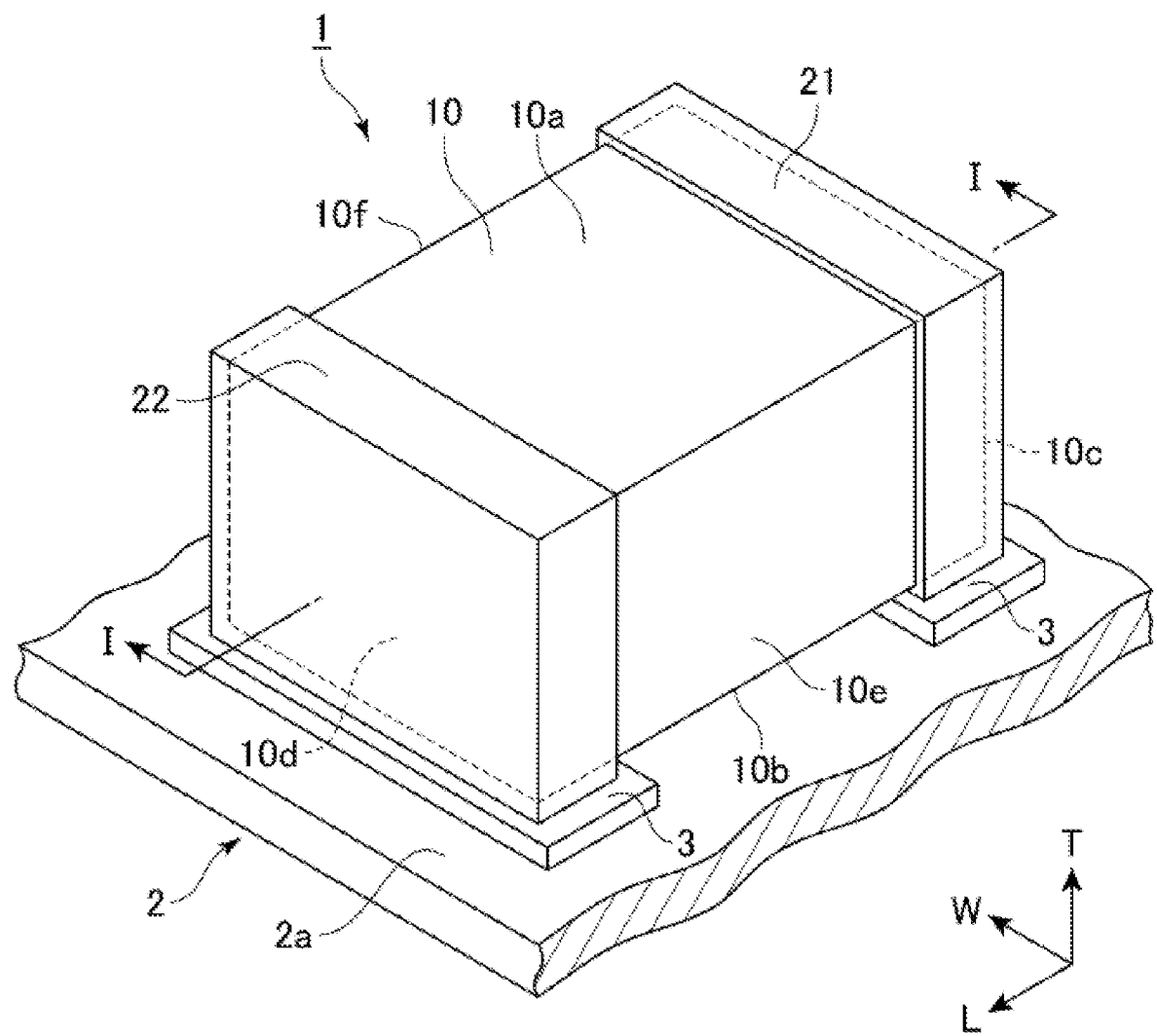
FIG. 1 is a perspective view schematically showing a coil component according to one embodiment of the present invention.

A coil component 1 according to one embodiment of the present invention will be hereinafter outlined with reference to FIGS. 1 to 4. The coil component 1 is a type of coil component to which the present invention is applicable. FIG. 1 is a perspective view schematically showing the coil component 1. As shown in FIG. 1, the coil component 1 includes a base body 10, a conductor 25 provided in the base body 10, an external electrode 21 disposed on a surface of the base body 10, and an external electrode 22 disposed on the surface of the base body 10 at a position spaced apart from the external electrode 21. In the coil component 1, the conductor 25 is the functional part. The conductor 25 is an example of the "functional part" recited in the claims. A glass layer 23 is provided between the external electrode 21 and the base body 10 and between the external electrode 22 and the base body 10. The glass layer 23 is made of glass, such as low-melting non-lead glass.

In this specification, a "length" direction, a "width" direction, and a "height" direction of the coil component 1 correspond to the "L axis" direction, the "W axis" direction, and the "T axis" direction in FIG. 1, respectively, unless otherwise construed from the context.

The coil component 1 is mounted on a mounting substrate 2a. The mounting substrate 2a has two lands 3 provided thereon. The coil component 1 may be mounted on the mounting substrate 2a by bonding the external electrodes 21, 22 to the lands 3 corresponding to the external electrodes 21, 22, respectively. As described, a circuit board 2 includes the coil component 1 and the mounting substrate 2a having the coil component 1 mounted thereon. Electronic devices in which the circuit board 1 may be installed include smartphones, tablets, game consoles, servers, electrical components of automobiles, and various other electronic devices.

The coil component 1 may be applied to inductors, transformers, filters, reactors, and various other coil components having the external electrodes 21, 22 on the surface of the base body 10. The coil component 1 may also be applied to coupled inductors, choke coils, and various other magnetically coupled coil components. Applications of the coil component 1 are not limited to those explicitly described herein.

The base body 10 is made of an insulating material. For example, the base body 10 is made of a ceramic material such as ferrite, a soft magnetic metal material, or a mixture thereof. In one embodiment, the base body 10 is made mainly of a magnetic material and formed in a rectangular parallelepiped shape. In the coil component 1 according to one embodiment of the invention, the base body 10 has a length (the dimension in the L axis direction) of 1.0 mm to 4.5 mm, a width (the dimension in the W axis direction) of 0.5 mm to 3.2 mm, and a height (the dimension in the T axis direction) of 0.5 mm to 5.0 mm. The dimensions of the base body 10 are not limited to those specified herein. The term "rectangular parallelepiped" or "rectangular parallelepiped shape" used herein is not intended to mean solely "rectangular parallelepiped" in a mathematically strict sense.

The base body 10 has a first principal surface 10a, a second principal surface 10b, a first end surface 10c, a second end surface 10d, a first side surface 10e, and a second side surface 10f. These six surfaces define the outer periphery of the base body 10. The first principal surface 10a and the second principal surface 10b are at the opposite ends in the height direction, the first end surface 10c and the second end surface 10d are at the opposite ends in the length direction, and the first side surface 10e and the second side surface 10f are at the opposite ends in the width direction.

As shown in FIG. 1, the first principal surface 10a lies on the top side of the base body 10, and therefore, the first principal surface 10a may be herein referred to as "the top surface." Similarly, the second principal surface 10b may be referred to as "the bottom surface." The coil component 1 is disposed such that the first principal surface 10a faces the circuit board, and therefore, the first principal surface 10a may be herein referred to as "the mounting surface." The top-bottom direction of the coil component 1 mentioned herein refers to the top-bottom direction in FIG. 1.

In one or more embodiments, the base body 10 is formed of an insulating material having a high affinity for the glass constituting the glass layers 23. The "high affinity" between the base body 10 and the glass means that the surface of the base body 10 has a high wettability for the glass, and thus the glass is easily adhered to the surface of the base body 10. When the base body 10 contains an oxide, the base body 10 has a high affinity for the glass constituting the glass layers 23. Examples of the oxide contained in the base body 10 include Fe oxide contained in the ferrite material and an oxide film formed in the surfaces of the metal magnetic particles. In the embodiment shown, the base body 10 contains a plurality of first metal magnetic particles 11 and a plurality of second metal magnetic particles 12. An oxide film is formed in each of the surfaces of the plurality of first metal magnetic particles 11 and the plurality of second metal magnetic particles 12, and adjacent particles are bonded to each other via the oxide films. In other words, the base body 10 is formed of the plurality of first metal magnetic particles 11 and the plurality of second metal magnetic particles 12 bonded to each other via the oxide films. The base body 10 may contain a non-magnetic material.

The plurality of first metal magnetic particles 11 have a larger average particle size than the plurality of second metal magnetic particles 12. That is, the average particle size of the plurality of first metal magnetic particles 11 (hereinafter referred to as "the first average particle size") is different from the average particle size of the plurality of second metal magnetic particles 12 (hereinafter referred to as "the second average particle size"). For example, the first average particle size is 30 μm, and the second average particle size is 2 μm. The first average particle size may be larger than 30 μm or smaller than 30 μm. The first average particle size may be larger than 2 μm or smaller than 2 μm. In one embodiment of the present invention, the base body 10 may further contain a plurality of third metal magnetic particles (not shown) having an average particle size different from the first average particle size and the second average particle size. The third average particle size, or the average particle size of the third metal magnetic particles, may be smaller than the first average particle size and the second average particle size. The first metal magnetic particles 11, the second metal magnetic particles 12, and the third metal magnetic particles contained in the magnetic base body 10 may be hereinafter collectively referred to as "the metal magnetic particles" when they need not be distinguished from one another. The "average particle size" of the metal magnetic particles contained in the base body 10 is determined based on a particle size distribution. To determine the particle size distribution, the magnetic base body is cut along the thickness direction (T-axis direction) to expose a cross-section, and the cross-section is scanned by a scanning electron microscope (SEM) to take a photograph at a 1000 to 2000-fold magnification, and the particle size distribution is determined based on the photograph. For example, the value at 50 percent (D50) of the particle size distribution determined based on the SEM photograph can be set as the average particle size of the metal magnetic particles.

The first metal magnetic particles 11 and the second metal magnetic particles 12 can be formed of various soft magnetic materials. For example, a main ingredient of the first metal magnetic particles 11 is Fe. Specifically, the first metal magnetic particles 11 are particles of (1) a metal such as Fe or Ni, (2) a crystalline alloy such as an alloy containing Fe, Si, and Cr, an alloy containing Fe, Si, and Al, or an alloy containing Fe and Ni, (3) an amorphous alloy such as an alloy containing Fe, Si, Cr, B, and C or an alloy containing Fe, Si, Cr, and B, or (4) a mixture thereof. The composition of the metal magnetic particles contained in the magnetic base body 10 is not limited to those described above. The first metal magnetic particles 11 may contain, for example, 85 wt % or more Fe. This provides the magnetic base body 10 with an excellent magnetic permeability. The composition of the second metal magnetic particles 12 is either the same as or different from that of the first metal magnetic particles 11. When the magnetic base body 10 contains the plurality of third metal magnetic particles (not shown), the composition of the third metal magnetic particles is either the same as or different from that of the first metal magnetic particles 11, as with the second metal magnetic particles 12.

The surface of each of the metal magnetic particles may be coated with an insulating film. The insulating films are formed of, for example, a material such as glass having a high insulating property. For example, the insulating films are formed on the surfaces of the first metal magnetic particles 11 by mixing the first metal magnetic particles 11 with powder of a glass material in a friction mixer (not shown). The insulating films formed of the glass material are fixed to the surfaces of the first metal magnetic particles 11 through compression friction action in the friction mixer. The glass material may contain ZnO and $P_2O_5$. The insulating films may be formed of various glass materials. The insulating films may be formed of alumina powder, zirconia powder, or any other oxide powders having a high insulating property, in place of or in addition to the glass material. The thickness of the insulating films is, for example, 100 nm or smaller.

The second metal magnetic particles 12 may be coated with different insulating films than the first metal magnetic particles 11. The insulating films may be oxide films formed by oxidation of the second metal magnetic particles 12. The thickness of the insulating films is, for example, 20 nm or smaller. The insulating films may be oxide films formed in the surfaces of the second metal magnetic particles 12 by heat-treating the second metal magnetic particles 12 in the atmosphere. The insulating films may be oxide films containing oxides of Fe and other elements contained in the second metal magnetic particles 12. The insulating films may be iron phosphate films formed on the surfaces of the second metal magnetic particles 12 by placing the second metal magnetic particles 12 into phosphoric acid and stirring. The insulating films of the first metal magnetic particles 11 may be oxide films formed by oxidation of the first metal magnetic particles 11, whereas the insulating films of the second metal magnetic particles 12 may be coating films formed by a method other than oxidation of the second metal magnetic particles 12.

The coil component 1 according to one embodiment of the present invention includes the conductor 25 as the functional part. The conductor 25 is formed in a pattern. In the embodiment shown, the conductor 25 is wound around the coil axis Ax. When seen from above, the conductor 25 has, for example, an elliptic shape, a meander shape, a linear shape or a combined shape of these. The conductor 25 may have any shape other than those mentioned above, such as a spiral shape.

The conductor 25 is formed of Cu, Ag, or any other conductive materials. The entire surface of the conductor 25 other than its end surfaces may be coated with an insulating film. As shown, when the conductor 25 is wound around the coil axis Ax for a plurality of turns, each of the turns of the conductor 25 may be spaced from adjacent turns. In this arrangement, the base body 10 mediates between the adjacent turns.

Figure 2:
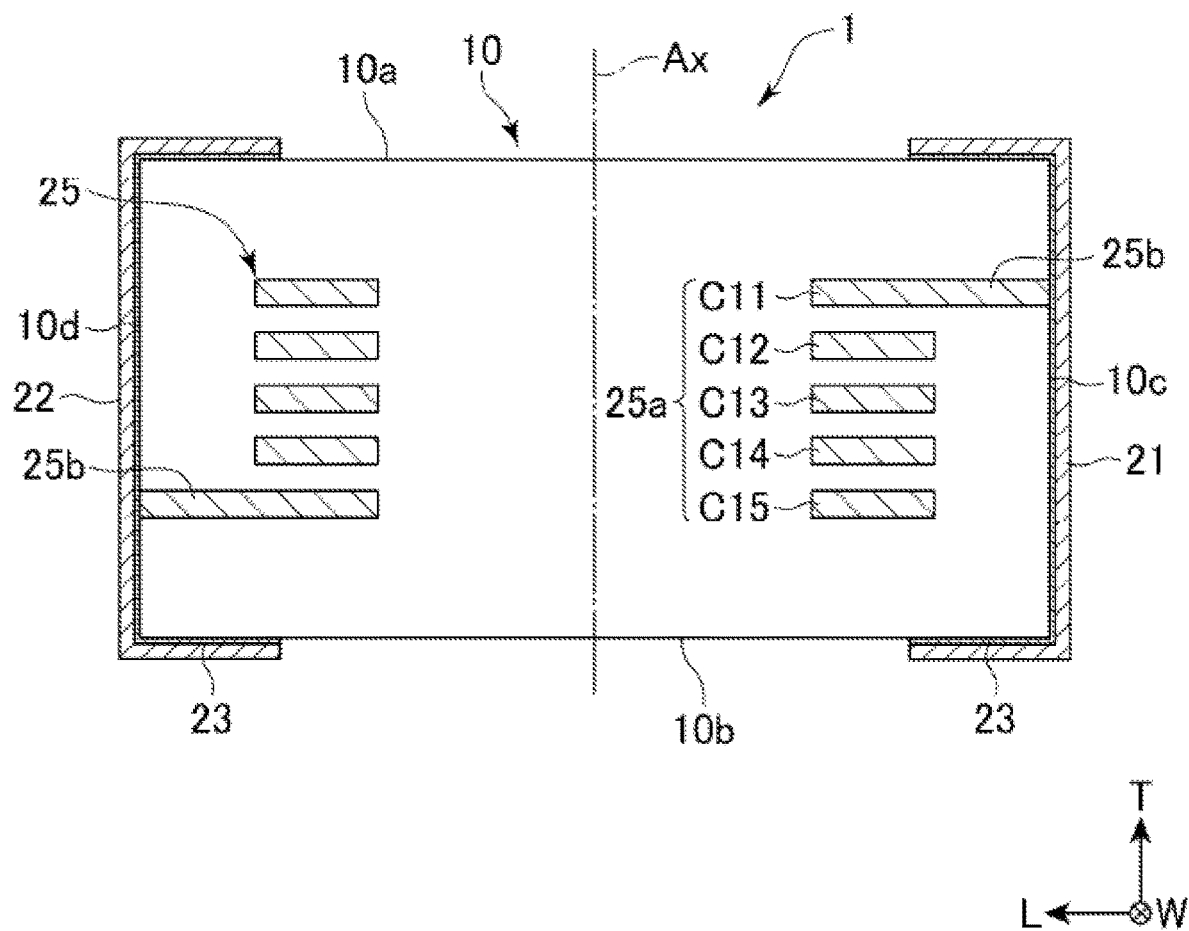
FIG. 2 schematically shows a cross section of the coil component of FIG. 1 cut along the line I-I.

In one or more embodiments, the conductor 25 is formed of a metal material and provided in the base body 10. The metal material used for the conductor 25 may be, for example, Ag, Pd, Cu, Al, or alloys of these metals. For example, the conductor 25 includes a winding portion 25a and lead-out conductors 25b. The winding portion 25a is wound spirally around the coil axis Ax extending along the thickness direction (the T axis direction), and the lead-out conductors 25b are led out from the opposite ends of the winding portion 25a to connect these opposite ends to the external electrodes 21, 22, respectively. The conductor 25 is connected to the external electrodes 21, 22 at the end surfaces 25b1 of the lead-out conductors 25b. In the embodiment shown, the coil axis Ax intersects the top surface 10a and the bottom surface 10b, but does not intersect the first and second end surfaces 10c, 10d and the first and second side surfaces 10e, 10f. In the embodiment shown, the winding portion 25a includes a plurality of conductor patterns C11 to C15. The conductor patterns C11 to C15 extend along the planar direction perpendicular to the coil axis Ax and are spaced from each other in the direction of the coil axis Ax. Each of the conductor patterns C11 to C15 is electrically connected to adjacent conductor patterns through the vias (not shown). In this way, the winding portion 25a of the conductor 25 is constituted by the conductor patterns C11 to C15 and the vias. The coil axis Ax of the present invention does not necessarily intersect the top surface 10a and the bottom surface 10b as shown in FIG. 2. For example, the coil axis Ax may intersect the first end surface 10c and the second end surface 10d, or it may intersect the first side surface 10e and the second side surface 10f.

Figure 3:
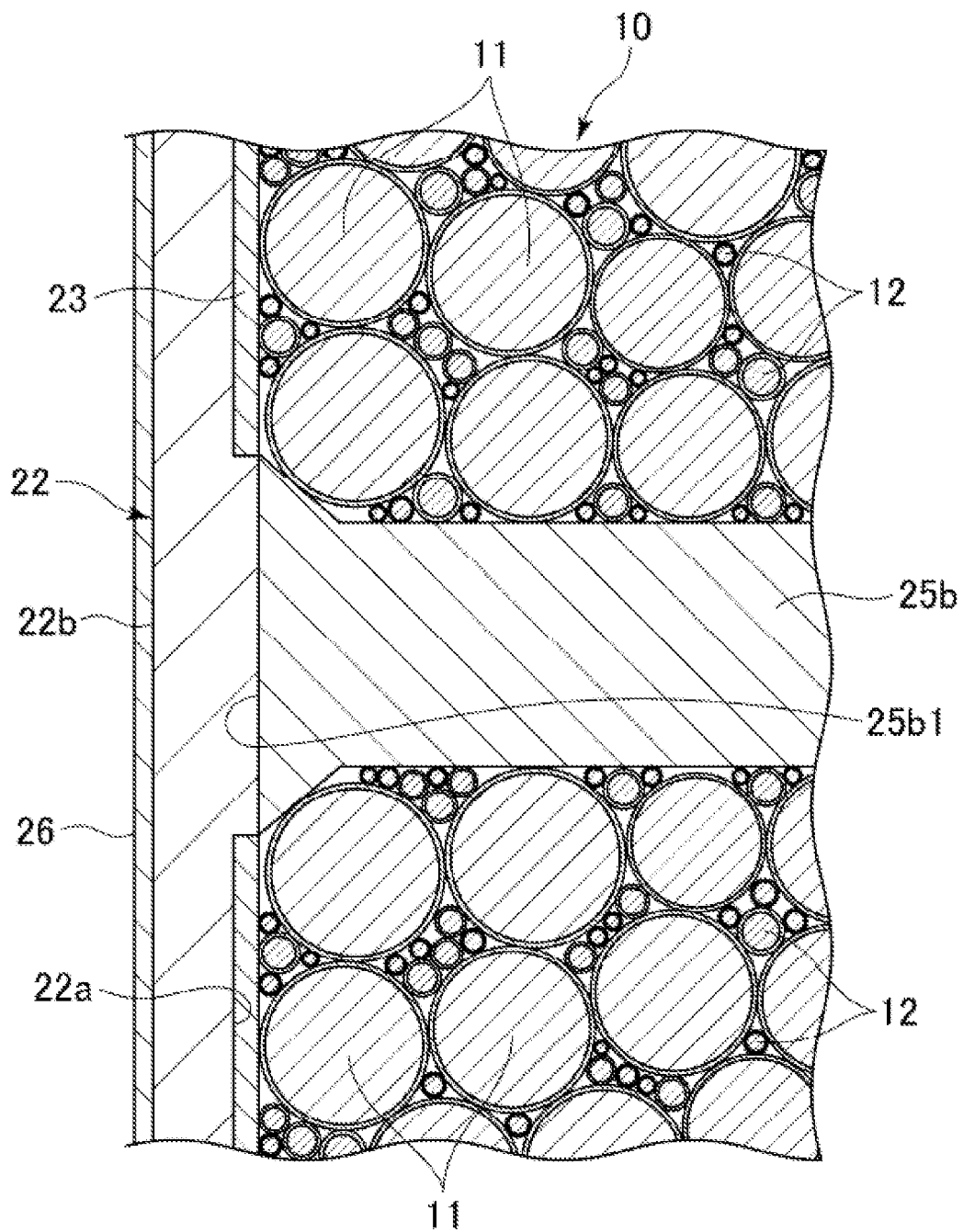
FIG. 3 is an enlarged sectional view showing, on an enlarged scale, a sectional surface around the bonding portion between one end portion of a conductor and an external electrode in the coil component shown in FIG. 1.
Figure 4:
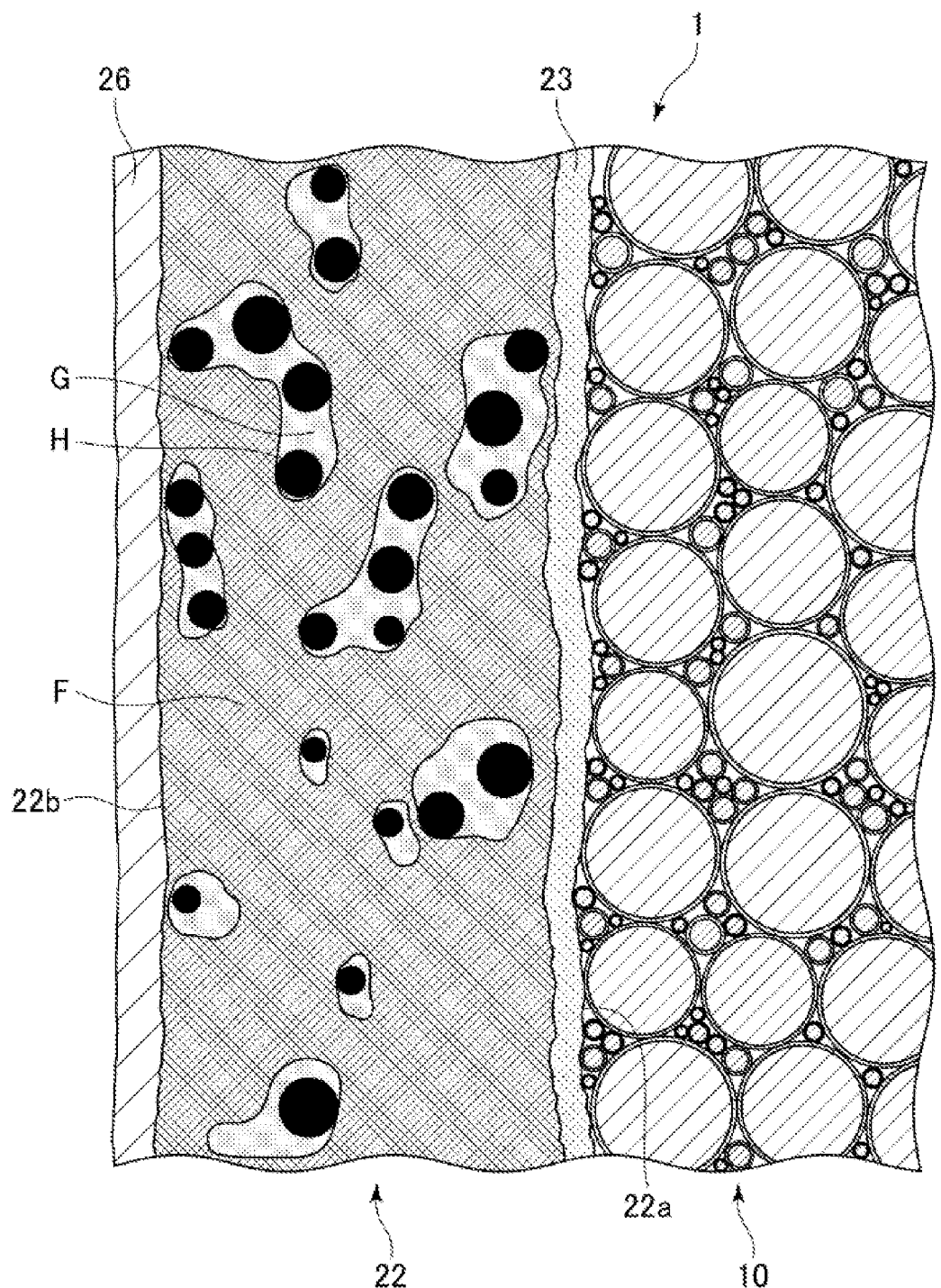
FIG. 4 is a schematic view showing an electron microscopy image of a sectional surface of a region in the coil component of FIG. 1 in which a base body and the external electrode are bonded together.

In one embodiment of the present invention, the external electrode 21 extends on a part of the first principal surface 10a, the second principal surface 10b, the first end surface 10c, the first side surface 10e, and the second side surface 10f of the base body 10. The external electrode 22 extends on a part of the first principal surface 10a, the second principal surface 10b, the second end surface 10d, the first side surface 10e, and the second side surface 10f of the base body 10. The external electrodes 21, 22 are spaced apart from each other. Shapes and arrangements of the external electrodes 21, 22 are not limited to those in the example shown. For example, the external electrodes 21, 22 may be in contact with the second principal surface 10b only. The external electrode 21 may be in contact with the second principal surface 10b and one or more other surfaces (for example, one or more of the first end surface 10c, the first side surface 10e, and the second side surface 10f). Likewise, the external electrode 22 may be in contact with the second principal surface 10b and one or more other surfaces (for example, one or more of the second end surface 10d, the first side surface 10e, and the second side surface 10f). As described above, a glass layer 23 is provided between the external electrode 21 and the base body 10 and between the external electrode 22 and the base body 10. FIGS. 3 and 4 show the glass layer 23 formed between the external electrode 22 and the base body 10, and the following description relates to the external electrode 22 and the glass layer 23 between the external electrode 22 and the base body 10 with reference to FIGS. 3 and 4. The description relating to the external electrode 22 will also apply to the external electrode 21 unless otherwise construed, and the description relating to the glass layer 23 between the external electrode 22 and the base body 10 will also apply to the glass layer 23 between the external electrode 21 and the base body 10 unless otherwise construed.

The external electrode 22 has an inner peripheral surface 22a and an outer peripheral surface 22b, and the inner peripheral surface 22a faces the surface of the base body 10. In the embodiment shown, the inner peripheral surface 22a of the external electrode 22 faces the first principal surface 10a, the second principal surface 10b, the second end surface 10d, the first side surface 10e, and the second side surface 10f. The outer peripheral surface 22b of the external electrode 22 is the surface of the external electrode 22 other than the inner peripheral surface 22a. The outer peripheral surface 22b of the external electrode 22 includes the portion of the surface of the external electrode 22 opposite to the surface of the base body 10. The outer peripheral surface 22b of the external electrode 22 may have a plating layer provided thereon. The external electrode 22 is connected with an external terminal (for example, an external lead terminal or the land 3) via the plating layer or in a direct manner. In the embodiment shown, the outer peripheral surface 22b of the external electrode 22 has a plating layer 26 provided thereon. The inner peripheral surface and the outer peripheral surface of the external electrode 21 are configured and arranged in the same manner as the inner peripheral surface 22a and the outer peripheral surface 22b of the external electrode 22. Specifically, the inner peripheral surface of the external electrode 21 is the surface facing the first principal surface 10a, the second principal surface 10b, the first end surface 10c, the first side surface 10e, and the second side surface 10f of the base body 10, and the outer peripheral surface of the external electrode 21 is the surface other than the inner peripheral surface. The glass layer 23 is in contact with the inner peripheral surface 21a of the external electrode 21 and the surface of the base body 10. The glass layer 23 is not provided on the end surface 25b1 of the lead-out conductor 25b of the conductor 25, and thus the end surface 25b1 of the conductor 25 is electrically connected to the external electrode 21. The glass layer 23 has a thickness of, for example, 0.2 μm to 2 μm.

The glass layer 23 is made of glass, such as low-melting non-lead glass. The low-melting non-lead glass is a glass material having a low melting point and containing one or more of $SiO_2$, $B_2O_3$, $V_2O_3$, $GeO_2$, and $Bi_2O_3$. In one or more embodiments of the present invention, the low-melting non-lead glass constituting the glass layer 23 has a melting point of 500° C. or lower. When glass contains lead, the melting point of the glass exceeds 500° C. in many cases. Also, in view of environmental problems, an electronic component should preferably not contain lead. Therefore, the glass 23 is preferably made of a low-melting non-lead glass. Further, the low-melting non-lead glass constituting the glass layer 23 preferably has a viscosity of $10^4$ to $10^7$ P (poise) at a sintering temperature of the metal particles contained in the external electrodes 21, 22.

As shown in FIG. 4, the external electrode 22 may include a metal portion F, a glass aggregation region G, and a metal oxide H. the metal portion F is made of a metal material and has electrical conductivity, the glass aggregation region G is made of aggregated glass, and the metal oxide H is electrically non-conductive. The external electrode 22 may include small voids (not shown). The voids in the external electrode 22 shrink or disappear during elongated heat treatment in the process of preparing the external electrodes (described later).

In one or more embodiments of the invention, the non-conductive metal oxide H is an oxide of a transition metal. Specifically, the metal oxide H may be $TiO_2$, $ZnO$, $Al_2O_3$, $ZrO_2$, $HfO_2$, $Fe_2O_3$, $Co_3O_4$, $Nb_2O_5$, $Ta_2O_5$, $NiO$, $CuO$ or the like. The metal oxide H is preferably a material that does not dissolve into the metal particles F in the temperature range for the heat treatment on the metal particles F (described later) (that is, the temperature range in which the metal particles F sinter). As compared to the metal particles F, the metal oxide H as described above has a higher affinity for the low-melting non-lead glass constituting the glass layer 23 in the temperature range for sintering of the metal particles F. The "high affinity" means that the surface of the metal oxide H has a high wettability for the low-melting non-lead glass, and thus the low-melting non-lead glass is easily adhered to the surface of the metal oxide H. The average particle size of the metal oxide H is, for example, 1 μm to 5 μm. The metal oxide H has a higher melting point than the low-melting non-lead glass.

As shown, the external electrode 22 includes a plurality of glass aggregation regions G made of aggregated low-melting non-lead glass. The low-melting non-lead glass constituting the glass aggregation regions G is the same as the low-melting non-lead glass constituting the glass layer 23. As described above, the metal oxide H has a high affinity for the low-melting non-lead glass constituting the glass layer 23 in the temperature range for sintering of the metal particles F. Therefore, in the heat treatment on the metal particles F, the low-melting non-lead glass contained in the conductive paste for forming the external electrode 22 softens and moves to the vicinity of the metal oxide H. Therefore, the glass aggregation regions G are formed so as to contact with the metal oxide H. In the external electrode 22, the glass aggregation regions G are arranged so as to surround a part or whole of one or more masses of the metal oxide H.

In at least a part of the outer peripheral surface 22b of the external electrode 22, the metal portion F made of the metal material and having electric conductivity is exposed. For example, the total of the areas of the regions in which the metal portion F is exposed in the outer peripheral surface 22b is three-fourth or larger of the area of the outer peripheral surface 22b. In the portions of the outer peripheral surface 22b in which the metal portion F is not exposed, the glass aggregation region G made of the aggregated low-melting non-lead glass or the metal oxide H, for example, may be exposed. It is also possible that no glass aggregation region G is exposed from the outer peripheral surface 22b. When the glass aggregation regions G are exposed from the outer peripheral surface 22b, the area of the regions in the outer peripheral surface 22b in which the glass aggregation regions G are exposed is less than one-fourth the area of the outer peripheral surface 22b. The proportion by area of the glass aggregation regions Gin the outer peripheral surface 22b is smaller than that of the glass aggregation regions G in the inner peripheral surface 22a. The glass aggregation regions G present in the outer peripheral surface 22b are island-shaped in the outer peripheral surface 22b, unlike the glass layer 23 that is layer-shaped and covers the inner peripheral surface 21a. Specifically, the glass aggregation regions G present in the outer peripheral surface 22b are a plurality of island-shaped regions separated from each other.

In the embodiment shown, the outer peripheral surface 22b of the external electrode 22 has the plating layer 26 provided thereon. The plating layer 26 may cover the whole outer peripheral surface 22b of the external electrode 22 (that is, the whole of the region in the surface of the external electrode 22 not facing the surface of the base body 10). The plating layer 26 is made of, for example, Ni or Sn. Besides Ni and Sn, the plating layer 26 may be made of a metal or an alloy that forms a barrier layer corrosion-resistant to heat in soldering, or the plating layer 26 may be made of a metal or an alloy having a high solder wettability. In the embodiment shown, the plating layer 26 is single-layered. Alternatively, the plating layer 26 may have multilayer structure formed of a plurality of layers. The metal portion F exposed from the outer peripheral surface 22b of the external electrode 22 is in contact with the plating layer 26 and may be metal-bonded to the plating layer 26. The outer peripheral surface 22b of the external electrode 22 may not have the plating layer 26 provided thereon. When the outer peripheral surface 22b of the external electrode 22 does not have the plating layer 26 provided thereon, the external electrode 22 may be connected directly with an external terminal (for example, an external lead terminal or the land 3). In this case, the metal portion F exposed from the outer peripheral surface 22b of the external electrode 22 may be metal-bonded to a metal material constituting the external terminal. The plating layer 26 and the metal material constituting the external terminal have a poor adhesion to the low-melting non-lead glass present in the outer peripheral surface 22b. The outer peripheral surface 22b includes no glass aggregation region G formed of the low-melting non-lead glass having a poor adhesion to the plating layer 26 and the metal material constituting the external terminal, or if the outer peripheral surface 22b includes the glass aggregation regions G, the region in which the glass aggregation regions G are present is less than one-fourth of the whole outer peripheral surface 22b. Therefore, the bonding between metal portion F and the plating layer 26 or the external terminal is not inhibited by the glass aggregation regions G. As a result, the bonding strength can be increased between the outer peripheral surface 22b of the external electrode 22 and the plating layer 26 or the external terminal.

The following describes a method of manufacturing the coil component 1 according to one or more embodiments. In one or more embodiments of the present invention, the base body 10 of the coil component 1 is produced by the sheet lamination method in which insulating sheets are stacked together. The first step of the sheet lamination method for producing the coil component 1 is to prepare the insulating sheets. The insulating sheets are formed from a slurry obtained by kneading metal magnetic particles made of a soft magnetic metal material with a resin. The slurry is molded into the insulating sheets using a sheet molding machine such as a doctor blade sheet molding machine. The metal magnetic particles are, for example, mixed particles including relatively large-sized metal magnetic particles to be first metal magnetic particles 11 after heat treatment and relatively small-sized metal magnetic particles to be second metal magnetic particles 12 after the heat treatment. The resin mixed and kneaded together with the metal magnetic particles may be, for example, a polyvinyl butyral (PVB) resin or any other resin materials heat-decomposable and susceptible of degreasing. When the base body 10 contains ferrite, the metal magnetic particles are replaced with ferrite powder.

The insulating sheets are cut into shape and penetrated in the thickness direction to form through-holes at predetermined positions. Next, a conductive paste is applied to the insulating sheets cut into shape by a known method such as screen printing, thereby forming a plurality of unfired conductor patterns that will later form the conductor patterns C11 after firing. Likewise, the conductive paste is also applied to other insulating sheets, thereby forming a plurality of unfired conductor patterns that will later form the conductor patterns C12 to C15 after firing. In forming the unfired conductor patterns, the conductive paste is filled into the through-holes of the insulating sheets to form unfired vias. The conductive paste for forming the conductor patterns C11 to C15 is obtained by, for example, kneading Ag, Pd, Cu, Al, or an alloy of these metals with a resin.

In the way described above, the unfired conductor patterns corresponding to the conductor patterns C11 to C15, and the unfired vias are formed on the insulating sheets, and these insulating sheets are stacked together with insulating sheets having no conductor formed thereon, so as to obtain a mother laminate. The insulating sheets having no conductor formed thereon are disposed at the top end and the bottom end of the mother laminate. The insulating sheets disposed at the top end and the bottom end of the mother laminate will later form a top cover layer and a bottom cover layer after firing. The top cover layer (not denoted by a reference sign) is disposed between the conductor 25 and the top surface 10a, and the bottom cover layer (not denoted by a reference sign) is disposed between the conductor 25 and the bottom surface 10b.

Next, the mother laminate is diced using a cutter such as a dicing machine or a laser processing machine to obtain a chip laminate. Next, the chip laminate is degreased and then heated. The heating is performed on the chip laminate at a temperature of 400° C. to 900° C. for a duration of 20 to 120 minutes, for example. Through this heat treatment, the insulating sheets and the conductive paste are fired to form the base body 10 containing the conductor 25.

Next, the surface of the base body 10 in which the end surface 25b1 of the lead-out conductor 25b of the conductor 25 is exposed is smoothed to remove oxides from the end surface 25b1 and the end surface 25b2. To smooth the surface of the base body 10, the surface of the base body 10 is polished with an abrasive, for example. The surface of the base body 10 may be etched after polishing. By way of an example, the abrasive has a smaller particle size than the first metal magnetic particles 11. When the average particle size of the first metal magnetic particles 11 is 30 μm, an abrasive having a particle size of 25 μm may be selected. The etching is accomplished by plasma etching, for example. Any etching method, such as plasma etching and others, is available that can remove oxides from the surface of the base body 10.

The next step is to prepare a conductive paste containing conductive metal particles, non-conductive metal oxide H, and the low-melting non-lead glass. The conductive paste may contain TEOS (tetraethoxysilane), $GeO_2$ (germanium dioxide), or $B_2O_3$ (boron oxide) as a sintering aid. The conductive paste, which will form the external electrodes 21, 22, is applied to the surface of the base body 10 by printing or any other known technique, thereby forming conductive paste layers.

The metal particles contained in the conductive paste may include a plurality of types of metal particles. In one or more embodiments of the present invention, the metal particles may be mixed particles including a plurality of first metal particles having an aspect ratio of 2 or lower and a plurality of second metal particles having an aspect ratio of 3 or higher. In one or more embodiments of the present invention, each of the plurality of second metal particles has an aspect ratio of 3 to 15. The aspect ratio of each first metal particle mentioned herein refers to a ratio of the dimension in the short axis direction to the dimension in the long axis direction of the first metal particle in the sectional surface of the electrode layer 22 in the thickness direction thereof. The aspect ratio of each second metal particle refers to the same. The dimensions of the first metal particles and the second metal particles in the respective long axis directions are herein referred to as the maximum particle sizes of the first metal particles and the second metal particles, respectively, and the dimensions of the first metal particles and the second metal particles in the respective short axis directions are herein referred to as the minimum particle sizes. The aspect ratio of each first metal particle refers to a value obtained by dividing the maximum particle size of the first metal particle with the minimum particle size thereof, and the aspect ratio of each second metal particle refers to a value obtained by dividing the maximum particle size of the second metal particle with the minimum particle size thereof. The particles having an aspect ratio of 2 or lower are herein referred to as low aspect ratio particles, and the particles having an aspect ratio of 3 or higher are herein referred to as high aspect ratio particles. Since the high aspect ratio particles are not spherical, these particles may be referred to as non-spherical particles. According to this definition, the first metal particles are low aspect ratio particles, and the second metal particles are high aspect ratio particles (non-spherical particles). The high aspect ratio particles (non-spherical particles) have flat, scaly, needle-like, or other shapes. The particles having an aspect ratio higher than 2 and lower than 3 are intermediate between the low aspect ratio particles and the high aspect ratio particles in view of the aspect ratio, and therefore, these particles are herein referred to as medium aspect ratio particles. The external electrode 22 may contain the medium aspect ratio particles. The external electrode 22 contains a small proportion of medium aspect ratio particles. For example, given that the total of the low aspect ratio particles, the medium aspect ratio particles, and the high aspect ratio particles is 100 vol %, the external electrode 22 may contain less than 10 vol % of medium aspect ratio particles.

In the sectional surface of the external electrode 22 in the thickness direction thereof, the average of the maximum particle sizes of the second metal particles may be larger than the average of the maximum particle sizes of the first metal particles. For example, the average of the maximum particle sizes of the second metal particles is 1 μm to 10 μm, and the average of the maximum particle sizes of the first metal particles is 0.1 μm to 10 μm.

The radius of curvature of the outer shape of each second metal particle is smallest at the opposite end portions of the second metal particle in the long axis direction thereof. In one or more embodiments of the present invention, the average of the minimum radii of curvature of the second metal particles (that is, the radii of curvatures of the end portions of the second metal particles in the respective long axis directions) is in a range from 0.1 μm to 3 μm. The average of the minimum radii of curvature of the second metal particles is obtained as follows. The external electrode 21 or the external electrode 22 are cut to exposed a sectional surface (for example, as shown in FIG. 4 (described later), a sectional surface cut along the TL surface is exposed), and the sectional surface is photographed at a magnification of 2000 using a scanning electron microscope (SEM). The minimum radius of curvature is determined for each of the second metal particles included in the photographed image, and these minimum radii of curvature thus determined for the second metal particles is averaged.

Given that the total of the low aspect ratio particles, the medium aspect ratio particles, and the high aspect ratio particles is 100 vol %, the proportion by volume of the low aspect ratio particles (the first metal particles) is, for example, 0 vol % to 70 vol %, and the proportion by volume of the high aspect ratio particles (the second metal particles) is, for example, 30 vol % to 100 vol %. The first metal particles and the second metal particles are heat-treated in the manufacturing process of the coil component 1. Through this heat-treatment, the first metal particles and the second metal particles are sintered, and the metallic bond occurs between the first metal particles, between the second metal particles, and between the first metal particles and the second metal particles.

The first metal particles and the second metal particles are formed of a metal material having a high electrical conductivity such as Ag, Cu, Au, Pd, or Ni, an alloy of these metal materials, or a mixture of these. The first metal particles and the second metal particles may contain a same metal as an ingredient. In the embodiment shown, both the first metal particles and the second metal particles are formed of Ag. It is also possible that the first metal particles and the second metal particles contain different metals, or the first metal particles and the second metal particles are formed only of different metals. Even when the first metal particles and the second metal particles contain different metals, the first metal particles and the second metal particles are metal-bonded to each other, and the bonding portions between the first metal particles and the second metal particles are alloyed, as a result of the heat treatment (described later). In this case, the combination of the metal contained in the first metal particles and the metal contained in the second metal particles is preferably selected such that the bonding strength is larger than that of the metallic bond between the same metals. The bonding strength of an alloy made by a combination of different metals is apparent to those skilled in the art. Both the first metal particles and the second metal particles have a higher melting point than the low-melting non-lead glass.

Next, heat treatment is performed on the base body 10 having the conductive paste layers formed thereon. Through the heat treatment, the metal particles contained in the conductive paste layers are sintered to form the metal portion F, and the conductive paste layers form the external electrodes 21, 22. The heat treatment is performed at a temperature of 550° C. to 800° C. for a duration of 30 to 60 minutes, for example. Also, the heat treatment is performed in a low-oxygen atmosphere or a reduction atmosphere, in accordance with the substance of the metal particles.

In the heat treatment, the temperature of the conductive paste layers is raised, and the low-melting non-lead glass contained in the conductive paste layers is melted. The low-melting non-lead glass melted is allowed to move in the conductive paste layers. Since the low-melting non-lead glass has a higher affinity for oxides than for metals, the low-melting non-lead glass melted moves toward the metal oxide H in the conductive paste layers. Further, in the heat treatment, when the plurality of first metal particles and the plurality of second metal particles contained in the conductive paste layers are sintered to form the metal portion F, the conductive paste layers contract, and the low-melting non-lead glass is pushed toward the outside of the conductive paste layers. Since the low-melting non-lead glass has a high affinity for the base body 10 containing the oxide of the metal magnetic particles, the low-melting non-lead glass melted tends to move toward the base body 10. As a result, a glass layer 23 is formed between the external electrode 21 formed by the heat treatment and the surface of the base body 10. The glass layer 23 is made of the low-melting non-lead glass that was contained in the conductive paste layer. Likewise, another glass layer is formed between the external electrode 22 and the surface of the base body 10. The low-melting non-lead glass contained in the conductive paste layer also moves toward the opposite side to the base body 10 during the aggregation of the conductive paste layer. However, the conductive paste layer contains the metal oxide H having a high affinity for the low-melting non-lead glass, and the metal oxide H hardly moves from the original position thereof during the aggregation of the conductive paste layer. Therefore, the metal oxide H inhibits the movement of the low-melting non-lead glass melted toward the opposite side to the base body 10. In this way, since the conductive paste contains the metal oxide H, the low-melting non-lead glass melted can be retained around the metal oxide H. Therefore, it can be inhibited that the low-melting non-lead glass melted moves toward the outer peripheral surface 22b of the external electrode 22 in the course of the heat treatment. As a result, it can be prevented that the outer peripheral surface 22b of the external electrode 22 is covered with the low-melting non-lead glass, and thus the metal portion F made of a metal material and having electrical conductivity can be easily exposed from the outer peripheral surface 22b.

In preparing the external electrodes 21, 22, the proportion by volume of the metal oxide H contained in the conductive paste to the whole conductive paste may be 2.0 vol % or larger. This proportion is determined for the following reason. If the amount of the metal oxide H in the conductive paste is too small, it cannot be inhibited that the low-melting non-lead glass melted in the heat treatment moves toward the outer peripheral surfaces of the external electrodes 21, 22 (for example, the outer peripheral surface 22b of the external electrode 22). Therefore, a large amount of low-melting non-lead glass undesirably moves to the outer peripheral surfaces of the external electrodes 21, 22.

In one or more embodiments of the present invention, the volume ratio of the low-melting non-lead glass to the metal oxide H contained in the conductive paste is 2.0 to 5.3. The reason why the lower limit of the volume ratio of the low-melting non-lead glass to the metal oxide H is 2.0 is that if the ratio of the low-melting non-lead glass to the metal oxide H is smaller than 2.0, the low-melting non-lead glass melted in the heat treatment is trapped by the metal oxide H and thus it cannot move to the surface of the base body 10, and therefore, the glass layers 23 may not be formed to a sufficient thickness between the external electrodes 21, 22 and the base body 10. If the glass layers 23 are not formed to a sufficient thickness, the bonding strength between the external electrodes 21, 22 and the base body 10 may be low. In one or more embodiments of the present invention, the volume ratio of the low-melting non-lead glass to the metal oxide H contained in the conductive paste is 2.0 or higher, and therefore, the glass layers 23 bond the external electrodes 21, 22 and the base body 10 firmly to each other. If the ratio of the low-melting non-lead glass to the metal oxide H is larger than 5.3, the amount of the low-melting non-lead glass in the conductive paste is excessive, and thus the metal oxide H cannot inhibit the movement of the excessive low-melting non-lead glass during the heat treatment. Therefore, if the conductive paste contains an excessive amount of low-melting non-lead glass, a large amount of low-melting non-lead glass moves not only toward the base body 10, but also toward the outer peripheral surfaces of the external electrodes 21, 22. As a result, the bonding strength is reduced between the outer peripheral surfaces of the external electrodes 21, 22 and the plating layers 26 or the external terminals. In one or more embodiments of the present invention, the volume ratio of the low-melting non-lead glass to the metal oxide H is 5.3 or lower, and therefore, the amount of the low-melting non-lead glass moving to the outer peripheral surfaces of the external electrodes 21, 22 is reduced, thereby bonding the external electrodes 21, 22 and the plating layers 26 or the external terminals firmly to each other.

In one or more embodiments of the present invention, the volume ratio of the low-melting non-lead glass to the total volume of the first metal particles and the second metal particles contained in the conductive paste is 12.1 to 29.8. If the volume ratio of the low-melting non-lead glass to the total volume of the first metal particles and the second metal particles is smaller than 12.1, the amount of the low melting non-lead glass is insufficient to form the glass layers 23, and as a result, the bonding strength is reduced between the external electrodes 21, 22 and the base body 10. In one or more embodiments of the present invention, the volume ratio of the low-melting non-lead glass to the total volume of the first metal particles and the second metal particles is 12.1 or higher, and therefore, the glass layers 23 are formed to a sufficient thickness, and the glass layers 23 bond the external electrodes 21, 22 and the base body 10 firmly to each other. If the volume ratio of the low-melting non-lead glass to the total volume of the first metal particles and the second metal particles is too large, the external electrodes 21, 22 undesirably have a high resistance value (specifically, the electrical resistance between the external electrodes 21, 22 and the external terminals connected to the external electrodes 21, 22 is high). In particular, if the volume ratio of the low-melting non-lead glass to the total volume of the first metal particles and the second metal particles is larger than 29.8, the amount of the low-melting non-lead glass is excessive, and thus a large amount of glass moves to the outer peripheral surfaces of the external electrodes 21, 22 during the heat treatment. The presence of a large amount of glass on the outer peripheral surfaces of the external electrodes 21, 22 reduces the bonding strength between the external electrodes 21, 22 and the plating layers 26 or the external terminals. In one or more embodiments of the present invention, the volume ratio of the low-melting non-lead glass to the total volume of the first metal particles and the second metal particles is 29.8 or lower, and therefore, the amount of the low-melting non-lead glass moving to the outer peripheral surfaces of the external electrodes 21, 22 is restricted, thereby bonding the external electrodes 21, 22 and the plating layers 26 or the external terminals firmly to each other.

After the external electrodes 21, 22 are formed by the heat treatment described above, the plating layers 26 are formed on the outer peripheral surfaces of the external electrodes 21, 22 by plating. The metal material constituting the plating layers 26 has a poor adhesion to the low-melting non-lead glass. However, when the proportion of the low-melting non-lead glass contained in the conductive paste is adjusted as described above, the outer peripheral surfaces of the external electrodes 21, 22 include almost no glass aggregation region G formed of the aggregated low-melting non-lead glass, or if the outer peripheral surfaces of the external electrodes 21, 22 include the glass aggregation regions G, the area of the region in which the glass aggregation regions G are exposed in each of the outer peripheral surfaces of the external electrodes 21, 22 can be less than one-fourth of the area of the outer peripheral surface. Therefore, it can be prevented or inhibited that the bonding strength between the plating layers 26 and the external electrodes 21, 22 is reduced by the glass aggregation regions G made from the low-melting non-lead glass. It is thus possible to bond the plating layers 26 and the external electrode 21, 22 firmly to each other.

The coil component 1 is manufactured through the steps described above. The external electrodes 21, 22 of the coil component 1 manufactured are soldered to the lands 3 of the mounting substrate 2a. When the plating layers 26 are disposed on the outer peripheral surfaces of the external electrodes 21, 22, each of the external electrodes 21, 22 is connected to the corresponding land 3 via the plating layer 26. In this case, since the plating layers 26 are firmly bonded to the outer peripheral surfaces of the external electrodes 21, 22, it can be inhibited that the coil component 1 comes off due to removal of the plating layers 26 from the external electrodes 21, 22. Accordingly, the coil component 1 can be bonded to the mounting substrate 2a more firmly. When no plating layers 26 are disposed on the outer peripheral surfaces of the external electrodes 21, 22, each of the external electrodes 21, 22 is connected to the corresponding land 3 at the respective outer peripheral surface. As described above, the outer peripheral surfaces of the external electrodes 21, 22 includes no glass aggregation regions G made from the low-melting non-lead glass, or if the outer peripheral surfaces of the external electrodes 21, 22 includes the glass aggregation regions G, the amount of the glass aggregation regions G is small. Therefore, it is prevented or inhibited that the glass aggregation regions G reduce the bonding strength between the external electrodes 21, 22 and the lands 3. It can thus be inhibited that the coil component 1 comes off due to removal of the external electrodes 21, 22 from the lands 3. Accordingly, the coil component 1 can be bonded to the mounting substrate 2a more firmly. In this way, the bonding strength of the coil component 1 to the mounting substrate 2a can be increased.

As described above, the external electrode 22 of the coil component 1 contains the non-conductive metal oxide H. The external electrode containing the metal oxide H is formed by heat-treating a conductive paste containing the non-conductive metal oxide H. In this heat treatment, the low-melting non-lead glass in the conductive paste are melted and allowed to move. Since the low-melting non-lead glass has a higher affinity for the base body 10 containing the oxide than for the metal particles, a part of the low-melting non-lead glass melted moves toward the surface of the base body 10 to form the glass layers 23 between the external electrodes 21, 22 and the base body 10. By contrast, external electrodes of a conventional coil component do not contain metal oxide H, and thus the low-melting non-lead glass melted in the heat treatment also moves toward the outer peripheral surfaces of the external electrodes 21, 22.

Figure 5:
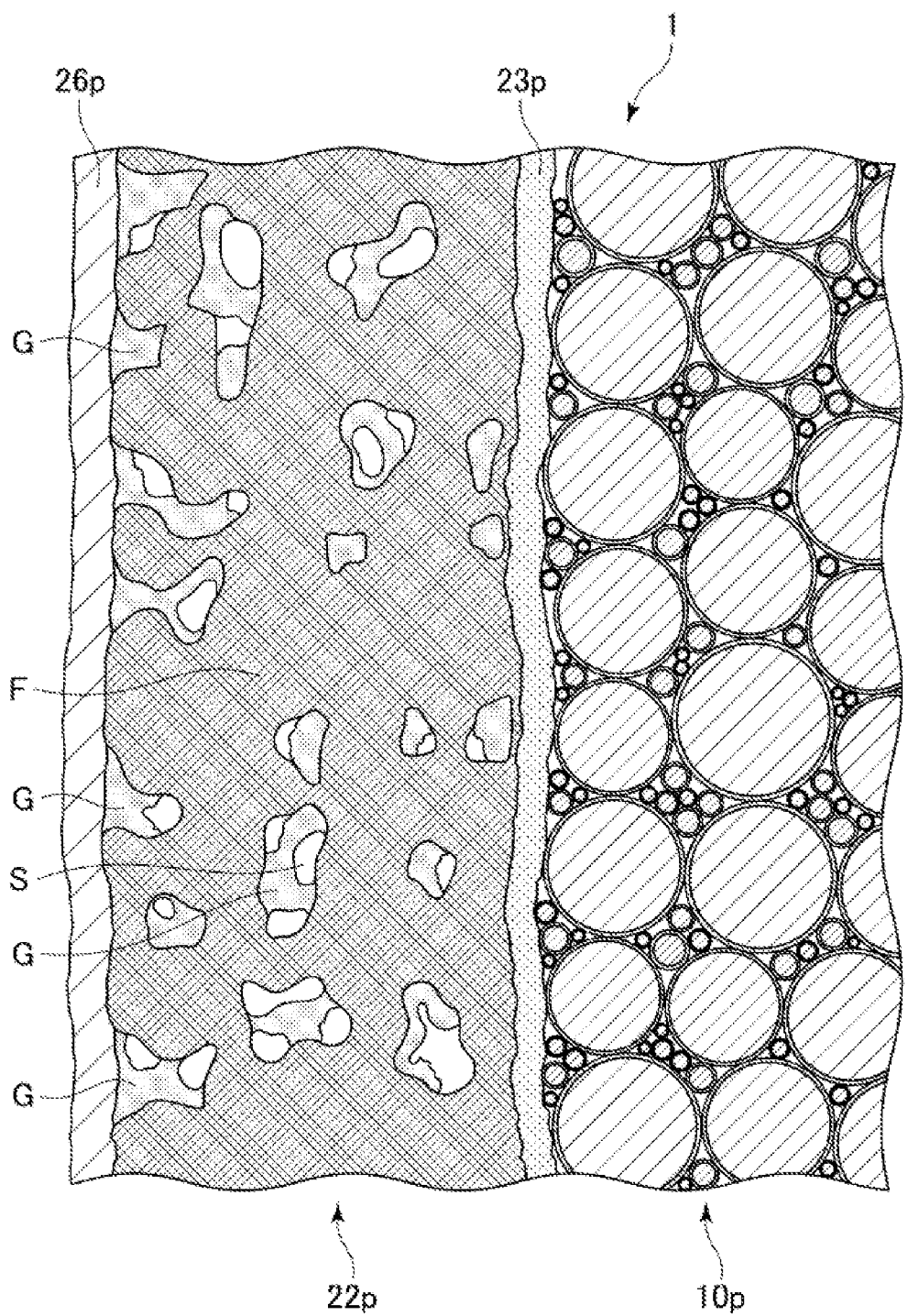
FIG. 5 is a schematic view showing an electron microscopy image of a sectional surface of a region in a conventional coil component in which a base body and an external electrode are bonded together.

With additional reference to FIG. 5, the following compares a conventional coil component to the coil component 1 according to one or more embodiments of the present invention. FIG. 5 is a sectional view schematically showing a sectional surface of a conventional coil element. FIG. 5 shows a sectional surface of the region of the conventional coil component corresponding to FIG. 4, so as to facilitate understanding of the conventional coil component in comparison to the coil component 1 shown in FIG. 4. As shown in FIG. 5, the conventional coil component includes a base body 10p, an external electrode 22p, and a glass layer 23p provided between the base body 10p and the external electrode 22p. The external electrode 22p is different from the external electrode 22 of the coil component 1 in that it does not contain the metal oxide H. The base body 10p and the glass layer 23p are configured in the same manner as the base body 10 and the glass layer 23 of the coil component 1, respectively. In the conventional coil component, the external electrode 22p does not contain the metal oxide H, and during the heat treatment for preparing the external electrode 22p, the low-melting non-lead glass melted moves to the outer peripheral surface of the external electrode 22p without being caught on the metal oxide H. Therefore, as shown in FIG. 5, more glass aggregation regions are formed in the outer peripheral surface of the external electrode 22p, as compared to the outer peripheral surface 22b of the external electrode 22 of the coil component 1. In the external electrode 22p, the low-melting non-lead glass moving to the outer peripheral surface of the external electrode 22p leaves space that collects to form voids S during the heat treatment. Unlike the external electrodes 21, 22 of the coil component 1 according to the present invention, the external electrode 22p of the conventional coil component does not contain the non-conductive metal oxide H. Therefore, the low-melting non-lead glass melted in the heat treatment tends to move to the surface of the external electrode 22p, resulting in a large number of voids S having a large volume formed in the external electrode 22p. With an elongated heating time for producing the external electrode 22p of the conventional coil component, the volume of the voids S can be reduced by grain growth. However, a large number of voids S will remain in the external electrode 22p even if the elongated heating time facilitates the grain growth. The voids S formed in the external electrode 22p cause reduction in strength of the external electrode 22p. Further, a large number of glass aggregation regions G are formed in the outer peripheral surface of the external electrode 22p. The glass aggregation regions G reduce the adhesion strength between the external electrode 22p and the external terminal connected to the surface of the external electrode 22p or the plating layer 26p formed on the surface of the external electrode 22p.

By contrast, the external electrodes 21, 22 of the coil component 1 according to one or more embodiments of the present invention contain the metal oxide H which has a higher affinity for the low-melting non-lead glass than for the metal portion F, the metal portion being made of the first metal particles and the second metal particles and the metal material formed by sintering of these metal particles and having electric conductivity. Therefore, the low-melting non-lead glass melted in the heat treatment moves toward the surface of the base body 10 and also aggregates around the metal oxide H. In this way, since the metal oxide H is contained in the external electrodes 21, 22, the low-melting non-lead glass can be retained around the metal oxide H in the heat treatment. Therefore, as compared to the conventional coil component in which the external electrodes 21, 22 do not contain the metal oxide H, the low-melting non-lead glass can be inhibited from moving to the outer peripheral surfaces of the external electrodes 21, 22. As a result, the amount of the glass aggregation region G produced in the outer peripheral surfaces of the external electrodes 21, 22 of the coil component 1 according to one or more embodiments of the present invention is smaller than the amount of the glass aggregation region G produced in the outer peripheral surface of the external electrode 22p of the conventional coil component. Accordingly, it is possible to obtain the coil component 1 including the external electrodes 21, 22 having a high bonding strength with the external terminal (for example, an external lead terminal or the land 3) or the plating layer 26.

In one or more embodiments of the present invention, the area of the region in which the metal portion F is exposed from the outer peripheral surface 22b is three-fourth or larger of the area of the outer peripheral surface 22b. Therefore, the metallic bond between the metal portion F of the external electrode 22 and the metal material constituting the plating layer 26 is possible in three-fourth or larger of the area of the outer peripheral surface 22b, thus increasing the bonding strength between the plating layer 26 formed on the outer peripheral surface 22b of the external electrode 22 and the external electrode 22. Since the area of the region of the outer peripheral surface 22b in which the glass aggregation regions G are exposed is less than one-fourth of the area of the outer peripheral surface 22b, and therefore, the electrical resistance between the external electrode 22 and the plating layer 26 can be reduced as compared to the conventional coil component in which more glass aggregation regions G are formed in the outer peripheral surface 22b.

In one or more embodiments of the present invention, the external electrode 22 may contain the second metal particles having an aspect ratio of 3 or higher. Also, the average of the minimum radii of curvature of the second metal particles may be 0.1 μm to 3 μm. The second metal particles as described above require a small amount of energy for the metallic bond at the opposite end portions thereof in the respective long axis directions, and therefore, the metallic bond can be readily formed between the metal particles at the opposite end portions of the second metal particles in the respective long axis directions.

In one or more embodiments of the present invention, the external electrodes 21, 22 may be prepared from a conductive paste containing 2 vol % or more metal oxide H. This proportion is determined for the following reason. If the amount of the metal oxide H in the conductive paste is too small, it cannot be inhibited that the low-melting non-lead glass melted in the heat treatment moves toward the outer peripheral surfaces of the external electrodes 21, 22 (for example, the outer peripheral surface 22b of the external electrode 22). Therefore, a large amount of low-melting non-lead glass undesirably moves to the outer peripheral surfaces of the external electrodes 21, 22.

In one or more embodiments of the present invention, the external electrodes 21, 22 may be prepared from a conductive paste in which the volume ratio of the low-melting non-lead glass to the metal oxide H is 2.0 to 5.3. Since the volume ratio of the low-melting non-lead glass to the metal oxide H contained in the conductive paste is 2.0 or higher, the low-melting non-lead glass moves easily to the surface of the base body 10 in the heat treatment of the conductive paste, making it possible to form the glass layers 23 on the surface of the base body 10. As a result, the glass layers 23 bond the external electrodes 21, 22 and the base body 10 firmly to each other. Since the volume ratio of the low-melting non-lead glass to the metal oxide H is 5.3 or lower, the amount of the low-melting non-lead glass moving to the outer peripheral surfaces of the external electrodes 21, 22 can be restricted. The metal material constituting the plating layers 26 and the lands 3 has a poor adhesion to the low-melting non-lead glass (or the glass aggregation regions G formed of aggregated low-melting non-lead glass). Therefore, since the amount of the low-melting non-lead glass moving to the outer peripheral surfaces of the external electrodes 21, 22 is restricted, the bonding strength can be further increased between the external electrodes 21, 22 and the plating layers 26 or the external terminals (for example, external lead terminals or the lands 3).

In one or more embodiments of the present invention, the volume ratio of the low-melting non-lead glass to the total volume of the first metal particles and the second metal particles contained in the conductive paste may be 12.1 to 29.8. Since the volume ratio of the low-melting non-lead glass to the total volume of the first metal particles and the second metal particles is 12.1 or higher, the glass layers 23 are formed to a sufficient thickness, and the glass layers 23 bond the external electrodes 21, 22 and the base body 10 firmly to each other. Since the volume ratio of the low-melting non-lead glass to the total volume of the first metal particles and the second metal particles is 29.8 or lower, the amount of the low-melting non-lead glass moving to the outer peripheral surfaces of the external electrodes 21, 22 is restricted, thereby bonding the external electrodes 21, 22 and the plating layers 26 or the external terminals firmly to each other.

Figure 6:
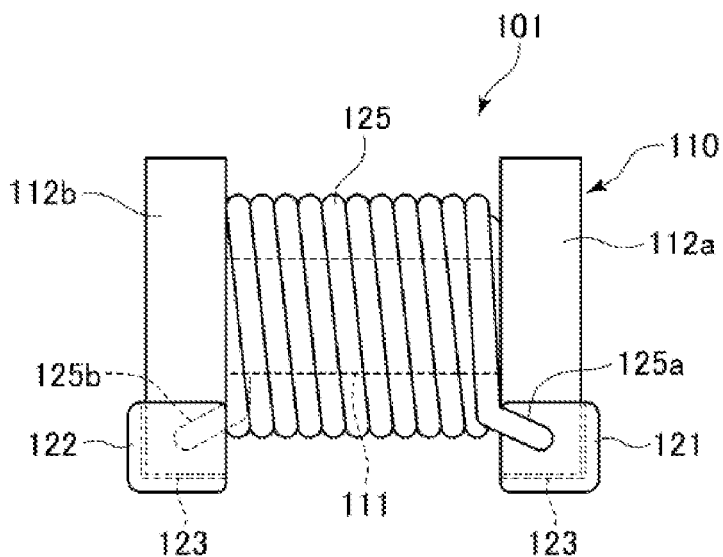
FIG. 6 is a front view schematically showing a coil component according to another embodiment of the present invention.

The coil component 1 is an example of an electronic component to which the invention can be applied. The invention can also be applied to various types of coil components other than the coil component 1. For example, the invention may be applied to wire-wound coil components. The following describes a coil component 101 according to another embodiment of the invention with reference to FIG. 6. The coil component 101 shown in FIG. 6 is a wire-wound inductor including a base body 110 and a coil conductor 125 (a winding wire 125) wound around the base body 110. As shown, the coil component 101 includes a base body 110, a coil conductor 125, a first external electrode 121 and a second external electrode 122.

The magnetic base body 110 includes a winding core 111, a flange 112a having a rectangular parallelepiped shape and provided on one of the ends of the winding core 111, and a flange 112b having a rectangular parallelepiped shape and provided on the other end of the winding core 111. The coil conductor 125 is wound on the winding core 111. The coil conductor 125 includes a conductive line made of a highly conductive metal material and an insulating coating covering and surrounding the conductive line. The first external electrode 121 extends along the bottom surface of the flange 112a, and the second external electrode 122 extends along the bottom surface of the flange 112b. A glass layer 123 is provided between the surface of the flange 112a of the base body 110 and the external electrode 121 and between the surface of the flange 112b of the base body 110 and the external electrode 122.

As with the glass layers 23, the glass layers 123 are made of glass, such as low-melting non-lead glass. As with the base body 10, the base body 110 is formed of an insulating material having a high affinity for the glass constituting the glass layers 123.

Next, a description is given of an example manufacturing method of the coil component 101. The base body 110 is first fabricated. To fabricate the base body 110, metal magnetic particles are mixed and kneaded with a resin to produce a resin mixture. The resin composition mixture is poured into a mold having a cavity shaped to correspond to the magnetic base body 110, and a predetermined molding pressure is applied while the resin composition mixture in the mold is heated. In this way, a molded body is fabricated. After this, the molded body is degreased and the degreased molded body is subjected to thermal treatment. As a result, the base body 110 is produced. The duration of the heating in the thermal treatment is, for example, 20 minutes to 120 minutes, and the heating temperature is, for example, 550° C. to 850° C.

Next, a conductive paste for forming the external electrodes 121, 122 is applied to the flanges 112a, 112b of the base body 110 obtained by the thermal treatment described above, thereby forming conductive paste layers. This conductive paste may be the same as the conductive paste used for forming the external electrodes 21, 22 of the coil component 1. Specifically, the conductive paste used for preparing the external electrodes 121, 122 contains the first metal particles and the second metal particles, both being conductive, the non-conductive metal oxide H, and the low-melting non-lead glass. Next, heat treatment is performed on the base body 110 having the conductive paste layers applied and formed thereon. Through the heat treatment, the first metal particles and the second metal particles contained in the conductive paste layers are sintered to form the metal portion F having electric conductivity, and the conductive paste layers form the external electrodes 121, 122. The heat treatment is performed at a temperature of 550° C. to 800° C. for a duration of 30 to 60 minutes, for example. In the heat treatment, the low-melting non-lead glass contained in the conductive paste moves to the surfaces of the flanges 112a, 112b, thereby forming a glass layer 123 between the surface of the flange 112a and the external electrode 121 and between the surface of the flange 112b and the external electrode 122.

The above-described thermal treating step produces the base body 110. The coil conductor 125 is then would around the base body 110, one end of the coil conductor 125 is connected to the first external electrode 121, and the other end is connected to the second external electrode 122. The coil component 101 is obtained in the above-described manner.

The shapes and positions of the constituent elements of the coil conductor 101 are not limited to the illustrated. For example, the magnetic base body 110 may be a ring-shaped toroidal core. The coil component 101 may be a toroidal coil including the ring-shaped base body 110 (toroidal core 110) and a coil conductor 125 wound around the base body 110. The coil component 101 may also include an exterior portion covering the coil conductor 125 wound around the base body 110. The exterior portion may contain a resin or glass and may contain a filler. The filler may be ferrite powder or metal magnetic particles.

As with the external electrodes 21, 22 of the coil component 1, the external electrodes 121, 122 of the coil component 101 also contain non-conductive metal oxide H. Accordingly, in heating the conductive paste for forming the external electrodes 121, 122, the low-melting non-lead glass can be retained around the metal oxide H. Therefore, as compared to the conventional coil component in which the external electrodes do not contain the metal oxide H, the amount of the low-melting non-lead glass produced on the outer peripheral surfaces of the external electrodes 121, 122 can be reduced. This inhibits the glass aggregation regions formed of the low-melting non-lead glass from deteriorating the bonding strength between the external electrodes 121, 122 and the plating layers provided on the outer peripheral surfaces of the external electrodes 121, 122 or the external terminals bonded to the outer peripheral surfaces of the external electrodes 121, 122. Further, since the base body 110 is made of an insulating material having a high affinity for the low-melting non-lead glass, the glass layers 123 are formed between the surface of the flange 112a and the external electrode 121 and between the surface of the flange 112b and the external electrode 122, and the glass layers 123 bond the external electrodes 121, 122 and the flanges 112a, 112b firmly to each other.

Figure 7:
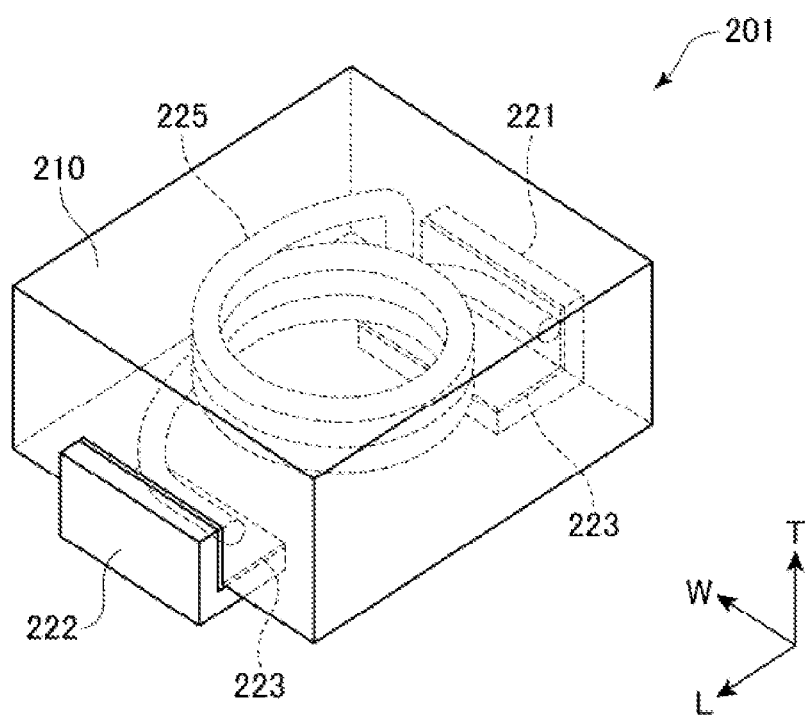
FIG. 7 is a perspective view schematically showing a coil component according to still another embodiment of the present invention.

The following describes a coil component 201 relating to another embodiment of the present invention with reference to FIG. 7. As shown, the coil component 201 includes a base body 210, a coil conductor 225 embedded in the base body 210, an external electrode 221 electrically connected to one end of the coil conductor 225, and an external electrode 222 electrically connected to the other end of the coil conductor 225. A glass layer 223 is provided between the surface of the base body 210 and the external electrode 221 and between the surface of the base body 210 and the external electrode 222. As with the glass layers 23, the glass layers 223 are made of glass, such as low-melting non-lead glass. As with the base body 10, the base body 210 is formed of an insulating material having a high affinity for the glass constituting the glass layers 223.

Next, the manufacturing method of the coil component 201 will be described. To begin with, metal magnetic particles are prepared. Subsequently, the metal magnetic particles 30 and a resin composition are mixed together to make a slurry (mixture). Next, a coil conductor, which is prepared in advance, is placed in a mold, the slurry is then poured into the mold in which the coil conductor is placed, and a compacting pressure is applied thereto to obtain a molded body containing the coil conductor thereinside. The molded body is then thermally treated. The molded body is thermally treated at a temperature of 550° C. to 850° C. for a duration of 20 minutes to 120 minutes. In this way, the base body 210 containing the coil conductor 225 therein can be obtained. Next, a conductor paste for forming the external electrodes 221, 222 is applied to the surface of the base body 210, which is produced in the above-described manner, to form the conductive paste layers. This conductive paste may be the same as the conductive paste used for forming the external electrodes 21, 22 of the coil component 1. Specifically, the conductive paste used for preparing the external electrodes 221, 222 contains the first metal particles and the second metal particles, both being conductive, the non-conductive metal oxide H, and the low-melting non-lead glass. Next, heat treatment is performed on the base body 210 having the conductive paste layers applied and formed thereon. Through the heat treatment, the first metal particles and the second metal particles contained in the conductive paste layers are sintered to form the metal portion F having electric conductivity, and the conductive paste layers form the external electrodes 221, 222. The heat treatment is performed at a temperature of 550° C. to 800° C. for a duration of 30 to 60 minutes, for example. In the heat treatment, the low-melting non-lead glass contained in the conductive paste moves to the surfaces of the base body 210, thereby forming a glass layer 223 between the surface of the base body 210 and the external electrode 221 and between the surface of the base body 210 and the external electrode 122. The coil component 201 is obtained in the above-described manner.

As with the external electrodes 21, 22 of the coil component 1, the external electrodes 221, 222 of the coil component 201 also contain non-conductive metal oxide H. Accordingly, in heating the conductive paste for forming the external electrodes 221, 222, the low-melting non-lead glass can be retained around the metal oxide H. Therefore, as compared to the conventional coil component in which the external electrodes do not contain the metal oxide H, the amount of the low-melting non-lead glass produced on the outer peripheral surfaces of the external electrodes 221, 222 can be reduced. This inhibits the glass aggregation regions formed of the low-melting non-lead glass from deteriorating the bonding strength between the external electrodes 221, 222 and the plating layers provided on the outer peripheral surfaces of the external electrodes 221, 222 or the external terminals bonded to the outer peripheral surfaces of the external electrodes 221, 222. Further, since the base body 210 is made of an insulating material having a high affinity for the low-melting non-lead glass, the glass layers 223 are formed between the surface of the base body 210 and the external electrode 221 and between the surface of the base body 210 and the external electrode 222, and the glass layers 223 bond the external electrodes 221, 222 and the base body 210 firmly to each other.

The dimensions, materials, and arrangements of the constituent elements described for the above various embodiments are not limited to those explicitly described for the embodiments, and these constituent elements can be modified to have any dimensions, materials, and arrangements within the scope of the present invention. Furthermore, constituent elements not explicitly described herein can also be added to the above-described embodiments, and it is also possible to omit some of the constituent elements described for the embodiments.

For example, an electronic component related to one embodiment of the present invention may be a capacitor including a pair of electrodes producing a capacitance as a functional part. In this case, the external electrode 21 is electrically connected to one of the electrodes of the functional part, and the external electrode 22 is electrically connected to the other of the electrodes of the functional part. When the electronic component related to one embodiment of the present invention is a capacitor, the oxide contained in the base body may be, for example, ceramic materials such as alumina ($Al_2O_3$), zirconia, and barium titanate ($BaO_3Ti$).

EXAMPLES

Next, examples will now be described. The samples to be evaluated were fabricated in the following manner. Metal magnetic particles and a polyvinyl butyral (PVB) resin were mixed and kneaded together to obtain a slurry. The slurry was molded into insulating sheets using a doctor blade sheet molding machine. The insulating sheets were heated at 550° C. for a duration of 60 minutes to obtain fired insulating sheets. The fired insulating sheets were diced into 24 insulating substrates having the same shape. Next, a conductive paste containing Ag particles, low-melting non-lead glass ($TiO_2$—$SiO_2$—$B_2O_3$ based glass), and metal oxide (CuO) was applied to each of the insulating substrates by screen printing to form conductive paste layers. The Ag particles were mixed particles including spherical Ag particles having an aspect ratio of nearly 1 and having an average particle size of 0.2 μm and Ag particles having an aspect ratio of 10 and having an average minimum radius of curvature of 0.3. These Ag particles were mixed at a weight ratio of 4:6. Of the mixed particles, the spherical Ag particles having an average particle size of 0.2 μm are an example of the first metal particles, and the Ag particles having an aspect ratio of 10 and having an average minimum radius of curvature of 0.3 are an example of the second metal particles. After that, the insulating substrates having the conductive paste applied thereto were heated at a temperature of 0.7 Tm (Tm is the melting point of Ag) for a duration of 60 minutes, such that the Ag particles contained in the conductive paste were sintered, and the conductive paste layers formed Ag sintered layers. Next, copper wires having a diameter of 180 μm were prepared. One end portion of each copper wire was pressure-welded to the Ag sintered layer at a pressure of 250 kPa, and solid-phase bonding was accomplished between the conductive paste and the copper wire at 650° C. Subsequently, the copper wire was bent in the direction perpendicular to the conductive paste layer, and the other end portion of the bent copper wire was connected to a tension gauge. The tension gauge pulled the copper wire tight in the direction perpendicular to the conductive paste layer for measurement of 90-degree peel strength. The tension gauge used was a Mitutoyo 546 series dial tension gauge DTG-30N (30-300-30 gf range). The above measurement was performed on 24 samples (sample A1 to sample A24) having different ratios of the Ag metal particles, the low-melting non-lead glass, and the metal oxide contained in the conductive paste. The ratio of the Ag metal particles, the low-melting non-lead glass, and the metal oxide contained in the conductive paste for each sample and the measurement result of the bonding strength for each sample were as shown in Table 1 below. It should be noted that sample A15 is omitted from Table 1. In each sample, the Ag sintered layer is formed on the insulating substrate, and the copper wire is bonded to the Ag sintered layer through solid-phase bonding. Therefore, in the peeling test, peeling may occur between the insulating substrate and the Ag sintered layer and between the Ag sintered layer and the copper wire. The column "Peeling Mode" of Table 1 contains "first mode peeling" and "second mode peeling," the former indicating the samples in which peeling occurred between the insulating substrate and the Ag sintered layer during the measurement, the latter indicating the samples in which peeling occurred between the Ag sintered layer and the copper wire. In some of the samples, the first mode peeling occurred when the copper wire was pulled by a force exceeding 25 GPa, the upper limit of the measurement. For these samples, the column "90-degree Peel Strength" contains ">25.0," and the column "Peeling Mode" contains "first mode peeling." In some of the samples, none of the first mode peeling and the second mode peeling occurred when the copper wire was pulled by a force exceeding 25 GPa, the upper limit of the measurement, and the copper wire was broken during the measurement. For these samples, the column "Peeling Mode" of Table 1 contains "no peeling."

oxide in the conductive paste is 2.0 to 5.3, the 90-degree peel strength is high in both the bonding surface between the insulating substrate and the Ag sintered layer and the bonding surface between the Ag sintered layer and the copper wire.

Comparison between the measurement result of the sample A10 and the measurement results of the samples A11 to A14 confirmed that when the conductive paste contains metal oxide added therein, the peel strength of the bonding surface between the Ag sintered layer and the copper wire is increased. The measurement results of the samples A10 to A14 confirmed that when the ratio of glass to metal oxide in

TABLE 1

| Sample No. | Silver [Vol %] | Glass [Vol %] | Metal Oxide [Vol %] | Glass/Metal Oxide (Volume Ratio) | Glass/Ag (Volume Ratio) | 90-degree Peel Strength [GPa] | Peeling Mode |
|---|---|---|---|---|---|---|---|
| A1  | 100.0 | 0.0  | 0.0  | —   | 0.0%  | 7.2   | 1st mode peeling |
| A2  | 96.0  | 0.0  | 4.0  | 0.0 | 0.0%  | 8.5   | 1st mode peeling |
| A3  | 94.1  | 4.9  | 1.0  | 4.9 | 5.2%  | 16.1  | 1st mode peeling |
| A4  | 86.5  | 13.5 | 0.0  | —   | 15.6% | 15.4  | 2nd mode peeling |
| A5  | 86.5  | 12.0 | 1.5  | 8.0 | 13.9% | 16.8  | 2nd mode peeling |
| A6  | 87.4  | 10.6 | 2.0  | 5.3 | 12.1% | >25.0 | 1st mode peeling |
| A7  | 81.8  | 12.1 | 6.1  | 2.0 | 14.8% | >25.0 | no peeling |
| A8  | 86.5  | 6.7  | 6.8  | 1.0 | 7.7%  | 13.3  | 1st mode peeling |
| A9  | 86.5  | 3.5  | 10.0 | 0.4 | 4.0%  | 14.9  | 1st mode peeling |
| A10 | 80.1  | 19.9 | 0.0  | —   | 24.8% | 17.4  | 2nd mode peeling |
| A11 | 80.1  | 11.9 | 8.0  | 1.5 | 14.9% | 19.8  | 1st mode peeling |
| A12 | 80.1  | 14.4 | 5.5  | 2.6 | 18.0% | >25.0 | 1st mode peeling |
| A13 | 80.0  | 16.2 | 3.8  | 4.3 | 20.3% | >25.0 | no peeling |
| A14 | 80.2  | 16.5 | 3.3  | 5.0 | 20.6% | >25.0 | no peeling |
| A16 | 75.2  | 24.8 | 0.0  | —   | 33.0% | 8.6   | 2nd mode peeling |
| A17 | 78.7  | 10.8 | 10.5 | 1.0 | 13.7% | 16.3  | 1st mode peeling |
| A18 | 78.7  | 16.0 | 5.3  | 3.0 | 20.3% | >25.0 | 1st mode peeling |
| A19 | 72.8  | 21.7 | 5.5  | 3.9 | 29.8% | >25.0 | no peeling |
| A20 | 75.2  | 21.3 | 3.5  | 6.1 | 28.3% | 19.7  | 2nd mode peeling |
| A21 | 75.2  | 22.0 | 2.8  | 7.9 | 29.3% | 16.6  | 2nd mode peeling |
| A22 | 66.0  | 34.0 | 0.0  | —   | 51.5% | 12.9  | 2nd mode peeling |
| A23 | 65.0  | 26.5 | 8.5  | 3.1 | 40.8% | 17.9  | 2nd mode peeling |
| A24 | 66.0  | 28.3 | 5.7  | 5.0 | 42.9% | 15.9  | 2nd mode peeling |
| A25 | 65.8  | 31.1 | 3.1  | 10.0| 47.3% | 12.9  | 2nd mode peeling |

The measurement results of the peel strength of the samples A1 to A3 shown in Table 1 confirmed the following: when the conductive paste contains no glass, peeling is apt to occur between the insulating substrate and the Ag sintered layer; and when the conductive paste contains small amounts of glass and metal oxide added therein, the peel strength is improved as compared to the case where the conductive paste contains no glass.

The measurement results of the samples A1, A3, and A4 confirmed that when the conductive paste contains a small proportion of glass, the peeling mode is the first mode, whereas when the conductive paste contains a large proportion of glass, the peeling mode is the second mode.

The measurement results of the samples A4 and A5 confirmed that when the conductive paste contains metal oxide added therein, the peel strength of the bonding surface between the Ag sintered layer and the copper wire is increased. The measurement results of the samples A4 to A9 confirmed that when the ratio of glass to metal oxide in the conductive paste is low (in other words, when the ratio of metal oxide to glass in the conductive paste is high), the first mode peeling is apt to occur, whereas when the ratio of glass to metal oxide in the conductive paste is high (in other words, when the ratio of metal oxide to glass in the conductive paste is low), the second mode peeling is apt to occur. In particular, the measurement results of the samples A6 and A7 confirmed that when the ratio of glass to metal oxide in the conductive paste is low, the first mode peeling is apt to occur. In particular, the measurement results of the samples A12 and A14 confirmed that when the ratio of glass to metal oxide in the conductive paste is 2.6 to 5.0, the 90-degree peel strength is high in both the bonding surface between the insulating substrate and the Ag sintered layer and the bonding surface between the Ag sintered layer and the copper wire.

Comparison between the measurement result of the sample A16 and the measurement results of the samples A17 to A21 confirmed that when the conductive paste contains metal oxide added therein, the peel strength of the bonding surface between the Ag sintered layer and the copper wire is increased. Likewise, the measurement results of the samples A16 to A21 confirmed that when the ratio of glass to metal oxide in the conductive paste is low, the first mode peeling is apt to occur, whereas when the ratio of glass to metal oxide in the conductive paste is high, the second mode peeling is apt to occur. In particular, the measurement results of the samples A18 and A19 confirmed that when the ratio of glass to metal oxide in the conductive paste is 3.0 to 3.9, the 90-degree peel strength is high in both the bonding surface between the insulating substrate and the Ag sintered layer and the bonding surface between the Ag sintered layer and the copper wire.

Comparison between the measurement result of the sample A22 and the measurement results of the samples A23 to A25 confirmed that when the conductive paste contains metal oxide added therein, the peel strength of the bonding surface between the Ag sintered layer and the copper wire is increased.

The measurement results of the samples A3, A8, and A9 indicated that when the volume ratio of glass to the metal (Ag) in the conductive paste is 7.7 or lower, the bonding strength between the insulating substrate and the Ag sintered layer is lower, and the first mode peeling is more apt to occur, as compared to the case where the volume ratio of glass to the metal (Ag) in the conductive paste is 12.1 or higher. It was confirmed that when the volume ratio of glass to the metal (Ag) in the conductive paste is 12.1 or higher, the first mode peeling is less apt to occur.

For the samples A23 to A25, it was confirmed that a large amount of glass aggregated in the bonding surface between the Ag sintered layer and the copper wire. Therefore, the electric conductivity between the Ag sintered layer and the copper wire may possibly be degraded, as compared to other samples. When the volume ratio of glass to the metal (Ag) in the conductive paste is 29.8 or lower, the amount of glass produced in the bonding surface between the Ag sintered layer and the copper wire can be reduced, and thus it can be inhibited that the glass produced in the bonding surface deteriorates the electric conductivity.

Next, the following process was performed to determine the density of the Ag sintered layer in accordance with the shape of the Ag particles contained in the conductive paste and the amount of glass aggregate produced in the surface of the Ag sintered layer. First, in the same manner as with the samples A1 to A25, the insulating substrates were prepared, and screen printing was performed on each of the insulating substrates to apply a conductive paste containing 81.7 vol % Ag particles, 12.1 vol % low-melting non-lead glass ($TiO_2$—$SiO_2$—$B_2O_3$ based glass), and 6.1 vol % metal oxide (CuO), thereby forming a conductive paste layer. The Ag particles are small-sized spherical particles having an aspect ratio of nearly 1 and an average particle size of 0.2 μm, large-sized spherical particles having an aspect ratio of nearly 1 and an average particle size of 0.6 μm, first non-spherical particles having an aspect ratio of 10 and an average minimum radius of curvature of 0.3, second non-spherical particles having an aspect ratio of 7 and an average minimum radius of curvature of 2.0, or a mixture of these particles. The small-sized spherical particles and the large-sized spherical particles are examples of the first metal particles, and the first non-spherical particles and the second non-spherical particles are examples of the second metal particles. Next, the insulating substrates having the conductive paste applied thereto were heated at a temperature of 0.7 Tm (Tm is the melting point of Ag) for a duration of 60 minutes, such that the Ag particles contained in the conductive paste were sintered, and the conductive paste layers formed Ag sintered layers. The Ag sintered layers are examples of the external electrodes 21, 22, and the insulating substrates are an example of the base body 10.

Next, the surface of each of the Ag sintered layers (the surface opposite to the insulating substrate) was photographed at 2000-fold magnification with a scanning electron microscope (SEM). Image processing was performed on the photograph thus obtained to divide the photographed region into regions where glass aggregates are present and the other regions (regions where the silver particles or the metal oxide is exposed) based on the difference in brightness. The regions where glass aggregates are present and the other regions can be readily identified by the difference in brightness of the photographed image. Next, the area of the regions where glass aggregates were present was determined, and the proportion of the area of the regions where glass aggregates were present to the area of the whole region included in the photograph (hereinafter referred to as "the spatial proportion of glass was determined. Further, the Ag sintered layer was cut along its thickness direction to expose the cross section, and the cross section was photographed at 2000-fold magnification with a scanning electron microscope (SEM) to obtain a cross-sectional image. Image processing was performed on the cross-sectional image to divide the photographed region into voids and the other regions based on the difference in brightness. The voids and the other regions can be readily identified by the difference in brightness of the photographed image. Next, the area of the voids was determined, and the proportion of the area of the voids to the area of the whole region included in the photographed image (hereinafter referred to as "the spatial proportion of voids") was determined.

The above measurement of the area of the regions where glass aggregates were present and the area of the voids was performed on nine samples (sample B1 to sample B9) having different types of Ag particles contained in the conductive paste. The sample B1 was prepared using only the small-sized spherical particles as the Ag particles, and the sample B2 was prepared using only the large-sized spherical particles as the Ag particles. The sample B3 was prepared using only the first non-spherical particles as the Ag particles, and the sample B4 was prepared using only the second non-spherical particles as the Ag particles. The sample B5 was prepared using mixed particles as the Ag particles, the mixed particles including the small-sized spherical particles and the first non-spherical particles mixed at a weight ratio of 1:1. The sample B6 was prepared using mixed particles as the Ag particles, the mixed particles including the large-sized spherical particles and the first non-spherical particles mixed at a weight ratio of 1:1. The sample B7 was prepared using mixed particles as the Ag particles, the mixed particles including the small-sized spherical particles and the second non-spherical particles mixed at a weight ratio of 1:1. The sample B8 was prepared using mixed particles as the Ag particles, the mixed particles including the large-sized spherical particles and the second non-spherical particles mixed at a weight ratio of 1:1. The sample B9 was prepared using mixed particles as the Ag particles, the mixed particles including the first non-spherical particles and the second non-spherical particles mixed at a weight ratio of 1:1. 101011 The evaluation results of the spatial proportion of voids and the spatial proportion of glass for each sample were as shown in Table 2 below. The spatial proportion of voids was evaluated to be "low" for less than 15%, "medium" for 15% to less than 25%, and "high" for 25% or higher. The spatial proportion of glass was evaluated to be "low" for less than 10%, "medium" for 10% to less than 25%, and "high" for 25% or higher.

TABLE 2

| Sample No. | Ag Particles | Spatial Proportion of Glass | Spatial Proportion of Void |
| --- | --- | --- | --- |
| B1 | Small-sized spherical particles | High | High |
| B2 | Large-sized spherical particles | High | High |
| B3 | First non- | Medium | Medium |

TABLE 2-continued

| Sample No. | Ag Particles | Spatial Proportion of Glass | Spatial Proportion of Void |
|---|---|---|---|
| B4 | spherical particles Second non-spherical particles | Medium | Medium |
| B5 | Small-sized spherical particles + First non-spherical particles | Low | Low |
| B6 | Large-sized spherical particles + First non-spherical particles | Low | Low |
| B7 | Small-sized spherical particles + Second non-spherical particles | Low | Low |
| B8 | Large-sized spherical particles + Second non-spherical particles | Medium | Low |
| B9 | Frist non-spherical particles + Second non-spherical particles | Medium | Low |

The evaluation results of the samples B5 to B7 indicated that when the Ag sintered layer is prepared using the conductive paste containing, as the Ag particles, the mixed particles including the small-sized spherical particles or the large-sized spherical particles and the first non-spherical particles or the second non-spherical particles, a small amount of glass is present in the surface of the Ag sintered layer opposite to the insulating substrate, and a small amount of void is present in the Ag sintered layer (in other words, the Ag sintered layer has a high density). Therefore, the samples B5 to B7 have a low electrical resistance in the surface of the Ag sintered layer, and these samples have a high mechanical strength.

Comparison between the evaluation results of the samples B1, B2 and the evaluation results of the samples B3 to B9 indicated that in the Ag sintered layer prepared from the conductive paste containing the first non-spherical particles or the second non-spherical particles as the Ag particles, a smaller amount of glass is produced in the surface of the Ag sintered layer opposite to the insulating substrate, and a smaller amount of void is present in the Ag sintered layer, as compared to the Ag sintered layer prepared from the conductive paste containing only the small-sized spherical particles or the large-sized spherical particles as the Ag particles. The reason why a small amount of glass is present in the surface of the Ag sintered layer prepared from the conductive paste containing the first non-spherical particles or the second non-spherical particles as the Ag particles, and a small amount of void is present in such Ag sintered layer, is that the first non-spherical particles and the second non-spherical particles restrict movement of the melted glass.

The above findings indicate that when the Ag particles used for preparing the external electrodes include the first non-spherical particles or the second non-spherical particles (namely, the high aspect ratio particles), production of glass in the outer peripheral surfaces of the external electrodes (the surfaces opposite to the base body) can be restricted, and the external electrodes can have a high mechanical strength.

What is claimed is:

1. An electronic component comprising:
    an insulating base body;
    an external electrode provided on the base body and including a metal portion, glass, and metal oxide, the metal portion being made of a metal material and having electric conductivity, the metal oxide being electrically non-conductive; and
    a functional part made of a metal and electrically connected to the external electrode,
    wherein the external electrode includes a glass aggregation region made of an aggregation of the glass,
    wherein the glass aggregation region surrounds the metal oxide, and
    wherein the glass aggregation region is disposed apart from the insulating base body.

2. The electronic component of claim 1,
    wherein the external electrode has an inner peripheral surface and an outer peripheral surface, the inner peripheral surface faces a surface of the base body, the outer peripheral surface is opposite to the inner peripheral surface, and the metal portion is exposed from the outer peripheral surface, and
    wherein the electronic component includes a glass layer disposed in contact with the surface of the base body and the inner peripheral surface of the external electrode.

3. The electronic component of claim 2, wherein the metal portion is exposed in three-fourth or larger of an area of the outer peripheral surface.

4. The electronic component of claim 1, wherein the metal oxide is oxide of a transition metal.

5. The electronic component of claim 2, further comprising a plating layer disposed on the outer peripheral surface of the external electrode.

6. The electronic component of claim 1, wherein the functional part includes a conductor wound around a coil axis.

7. The electronic component of claim 1, wherein the functional part includes a pair of electrodes for generating a capacitance.

8. The electronic component of claim 1, wherein the glass does not contain lead, and a melting point of the glass is 500° C. or lower.

9. The electronic component of claim 1, wherein the base body includes oxide.

10. A circuit board comprising the electronic component of claim 1.

11. An electronic device comprising the circuit board of claim 10.

* * * * *